US011131891B2

(12) United States Patent
Sakai et al.

(10) Patent No.: US 11,131,891 B2
(45) Date of Patent: Sep. 28, 2021

(54) LIQUID CRYSTAL DISPLAY DEVICE

(71) Applicant: SHARP KABUSHIKI KAISHA, Sakai (JP)

(72) Inventors: Akira Sakai, Sakai (JP); Yuichi Kawahira, Sakai (JP); Koji Murata, Sakai (JP); Masahiro Hasegawa, Sakai (JP); Takako Koide, Sakai (JP); Kozo Nakamura, Sakai (JP); Kiyoshi Minoura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/630,115

(22) PCT Filed: Jul. 6, 2018

(86) PCT No.: PCT/JP2018/025619
§ 371 (c)(1),
(2) Date: Jan. 10, 2020

(87) PCT Pub. No.: WO2019/013109
PCT Pub. Date: Jan. 17, 2019

(65) Prior Publication Data
US 2021/0132450 A1 May 6, 2021

(30) Foreign Application Priority Data

Jul. 13, 2017 (JP) .............................. JP2017-137234

(51) Int. Cl.
*G02F 1/1343* (2006.01)
*G02F 1/13363* (2006.01)
(Continued)

(52) U.S. Cl.
CPC .. *G02F 1/134363* (2013.01); *G02F 1/133528* (2013.01); *G02F 1/133633* (2021.01);
(Continued)

(58) Field of Classification Search
CPC ......... G02F 1/133621; G02F 1/134363; G02F 1/134372; G02F 1/133633;
(Continued)

(56) References Cited

U.S. PATENT DOCUMENTS

2006/0203169 A1* 9/2006 Ozawa ................. G02F 1/1393
349/141
2009/0073352 A1* 3/2009 Hamilton .............. G02F 1/1393
349/96
(Continued)

FOREIGN PATENT DOCUMENTS

JP 2012-173672 A 9/2012

*Primary Examiner* — Angela K Davison
(74) *Attorney, Agent, or Firm* — ScienBiziP, P.C.

(57) ABSTRACT

The present invention provides a liquid crystal display device of a transverse electric field mode that may inhibit internal reflection and realize proper black display to which coloring does not occur. The present invention provides a liquid crystal display device including a first linear polarizer, a first λ/4 retardation layer, a first substrate, a second λ/4 retardation layer configured with a different material from the first λ/4 retardation layer, a liquid crystal layer that contains liquid crystals which are horizontally aligned in a case where no voltage is applied, plural electrode pairs that generate a transverse electric field in the liquid crystal layer by a voltage being applied, a second substrate, a second linear polarizer, and a backlight. In a case where a color of light emitted from the backlight is expressed by using chromaticity coordinates (x, y) of an XYZ color system, both of x and y are 0.32 or greater. The plural electrode pairs include a red electrode pair arranged in a red sub-pixel, a green electrode pair arranged in a green sub-pixel, and a blue electrode pair arranged in a blue sub-pixel. A white display applied voltage of the blue electrode pair is different from
(Continued)

the white display applied voltage of the red electrode pair and the white display applied voltage of the green electrode pair.

6 Claims, 8 Drawing Sheets

(51) Int. Cl.
*G02F 1/1335* (2006.01)
*G02F 1/1337* (2006.01)

(52) U.S. Cl.
CPC .. *G02F 1/133638* (2021.01); *G02F 1/133738* (2021.01); *G02F 2202/022* (2013.01); *G02F 2413/02* (2013.01); *G02F 2413/06* (2013.01); *G02F 2413/13* (2013.01)

(58) Field of Classification Search
CPC ......... G02F 1/133638; G02F 1/133637; G02F 1/133738; G02F 1/133528; G02F 2413/06; G02F 2413/13; F21V 9/08; F21V 9/083; G09G 3/3413; G02B 5/3083
See application file for complete search history.

(56) References Cited

U.S. PATENT DOCUMENTS

| | | | |
|---|---|---|---|
| 2012/0069277 A1* | 3/2012 | Wang | G02F 1/1336 349/106 |
| 2012/0218497 A1* | 8/2012 | Kajita | G02F 1/134363 349/98 |

* cited by examiner (a)

(b)

LIQUID CRYSTAL DISPLAY DEVICE

TECHNICAL FIELD

The present invention relates to a liquid crystal display device, more specifically to a liquid crystal display device of a transverse electric field mode.

BACKGROUND ART

As driving modes of liquid crystals, transverse electric field modes such as an in-plane switching (IPS) mode and a fringe field switching (FFS) mode have widely been used. A liquid crystal display panel is used not only for a television but also widely used for various purposes of use such as a laptop PC, a tablet PC, a smartphone, and a car navigation system and may be used under strong external light as in an outdoor environment. Thus, a liquid crystal display device of the IPS mode has been suggested which may inhibit reflection of external light, reduce light transmittance in a case of black display, and obtain proper image quality even in cases of use in both of indoor and outdoor environments (for example, see PTL 1).

CITATION LIST

Patent Literature

PTL 1: Japanese Unexamined Patent Application Publication No. 2012-173672

SUMMARY OF INVENTION

Technical Problem

However, in a liquid crystal display panel in related art, contrast may lower after a heat resistance test. The inventors had various investigations about causes of lowered contrast and found that a cause was degradation of a retardation plate for inhibiting internal reflection of the liquid crystal display panel and an increase in luminance in a case of black display. Then, the inventors used a highly durable retardation plate but found that it was difficult to inhibit internal reflection throughout the whole wavelength range of visible light and a screen was colored in a case of black display. To handle this situation, the inventors had an investigation on use of a more yellowish backlight than related art but found that another problem occurred: white display, which was basically desirably achromatic, was colored in yellow.

The present invention has been made in consideration of the above present circumstance, and an object thereof is to provide a liquid crystal display device of a transverse electric field mode that may realize proper display quality in which coloring does not occur to either of black display or white display, while inhibiting internal reflection.

Solution to Problem

The inventors had investigations on methods for inhibiting internal reflection of a liquid crystal display panel of a transverse electric field mode and focused on a fact that a pair of $\lambda/4$ retardation layers that had mutually orthogonal in-plane slow axes were provided and internal reflection might thereby be inhibited by an effect of a circular polarizer while a state optically equivalent to a liquid crystal display panel of a transverse electric field mode in related art was maintained. Then, it was found that black display was colored in blue in a case where the pair of $\lambda/4$ retardation layers was configured with different materials for a purpose of enhancing durability or the like. To handle this situation, the inventors had an investigation on reduction in blueness of black display by using a more yellowish backlight than related art but found that another problem occurred: white display, which was basically desirably achromatic, was colored in yellow. Thus, the inventors had investigations on a further improvement and found that yellowness of white display in a case where a more yellowish backlight than related art was used might be reduced by performing control of sub-pixels of red (R), green (G), and blue (B) by using a different voltage driving method from related art. Accordingly, the inventors conceived a fact that the above problem might successfully be solved and arrived at the present invention.

That is, one aspect of the present invention provides a liquid crystal display device including a liquid crystal display panel and a backlight. The liquid crystal display panel, in order from an observation surface side to a back surface side, includes: a first linear polarizer; a first $\lambda/4$ retardation layer that has an in-plane slow axis in a first direction; a first substrate; a second $\lambda/4$ retardation layer that is configured with a different material from the first $\lambda/4$ retardation layer and has an in-plane slow axis in a second direction which is orthogonal to the first direction; a liquid crystal layer that contains liquid crystals which are horizontally aligned in a case where no voltage is applied; plural electrode pairs that generate a transverse electric field in the liquid crystal layer by a voltage being applied; a second substrate; and a second linear polarizer. In a case where a color of light emitted from the backlight is expressed by using chromaticity coordinates (x, y) of an XYZ color system, both of x and y are 0.32 or greater. The plural electrode pairs include a red electrode pair arranged in a red sub-pixel, a green electrode pair arranged in a green sub-pixel, and a blue electrode pair arranged in a blue sub-pixel. A white display applied voltage of the blue electrode pair is different from the white display applied voltage of the red electrode pair and the white display applied voltage of the green electrode pair.

Advantageous Effects of Invention

The present invention may provide a liquid crystal display device of a transverse electric field mode that may realize proper display quality in which coloring does not occur to either of black display or white display, while inhibiting internal reflection.

DESCRIPTION OF EMBODIMENTS

Figure 1:
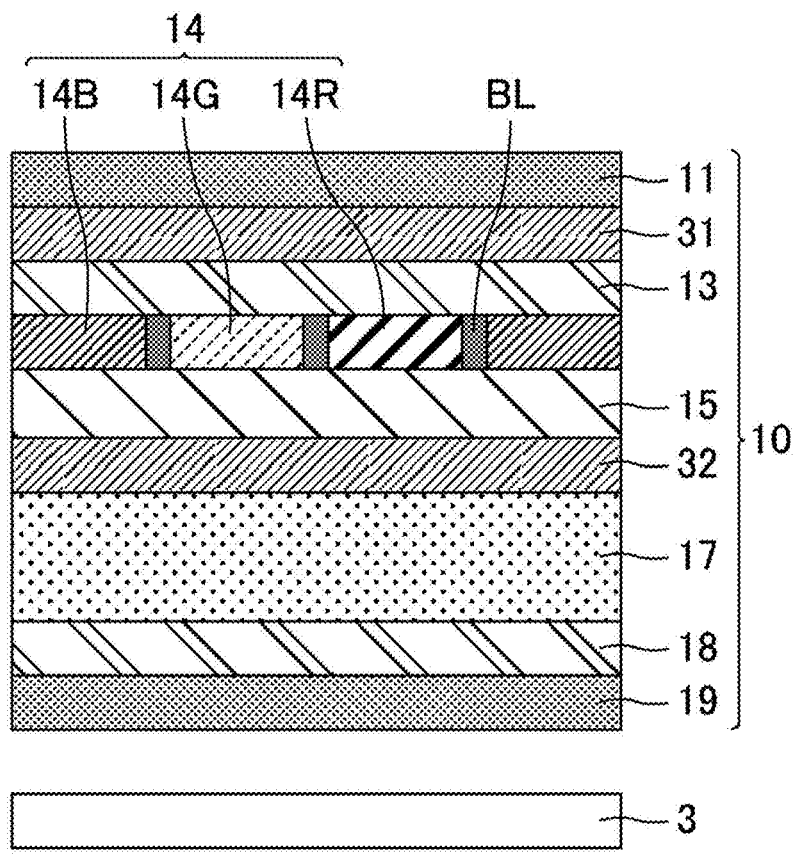
FIG. 1(a) is a cross-sectional schematic diagram that illustrates a liquid crystal display device of a first embodiment.
FIG. 1(b) is a cross-sectional schematic diagram that illustrates one example of a configuration of a second substrate.
Figure 1:
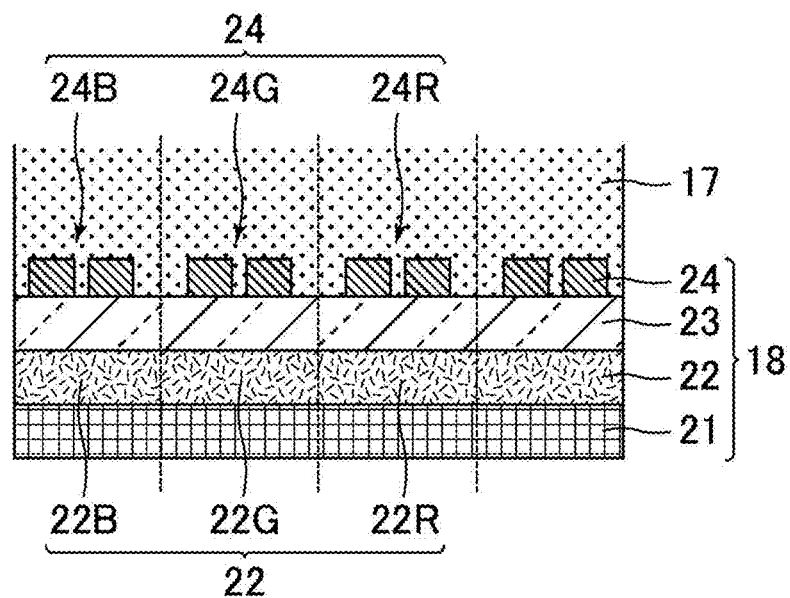

The present invention will hereinafter be described further in detail with reference to drawings and by raising embodiments. However, the present invention is not limited only to those embodiments. Further, configurations of the embodiments may appropriately be combined and altered within the scope that does not depart from the gist of the present invention.

In this specification, "observation surface side" means a closer side to a screen (display surface) of a liquid crystal display device, and "back surface side" means a farther side from the screen (display surface) of the liquid crystal display device.

In this specification, "λ/4 retardation layer" means a retardation layer that gives at least an in-plane retardation of ¼ wavelength to light at a wavelength of 550 nm and may be a retardation layer that gives an in-plane retardation of 100 nm or longer to 176 nm or shorter. Incidentally, light at a wavelength of 550 nm is light at a wavelength at which human visibility is highest. An in-plane retardation is defined by $R=(ns-nf) \times d$. Here, a term ns represents the larger one of main refractive indices nx and ny in the in-plane directions of the retardation layer, and a term nf represents the smaller one of main refractive indices nx and ny in the in-plane directions of the retardation layer. A main refractive index indicates a value with respect to light at a wavelength of 550 nm unless otherwise noted. An in-plane slow axis of the retardation layer indicates an axis in the direction that corresponds to ns, and an in-plane fast axis indicates an axis in the direction that corresponds to nf. A term d represents the thickness of the retardation layer. In this specification, "retardation" means an in-plane retardation unless otherwise noted.

In this specification, red (R), green (G), and blue (B) are defined as follows. "Red" is a color whose main wavelength is 600 nm or longer to 780 nm or shorter and is a color whose main wavelength is desirably 620 nm or longer to 750 nm or shorter. "Green" is a color whose main wavelength is 500 nm or longer to 600 nm or shorter and is a color whose main wavelength is desirably 500 nm or longer to 570 nm or shorter. "Blue" is a color whose main wavelength is 380 nm or longer to 500 nm or shorter and is a color whose main wavelength is desirably 450 nm or longer to 495 nm or shorter.

In this specification, among display units that configure the screen of the liquid crystal display device, a display unit that is capable of displaying plural colors will be referred to as "pixel", and plural display units, which are included in each pixel and each of which is capable of displaying a single color, will be referred to as "sub-pixel". One pixel is typically configured with a combination of a red sub-pixel, a green sub-pixel, and a blue sub-pixel.

In this specification, two axes (directions) being orthogonal indicate that an angle (absolute value) formed by the two axes is within a range of 90°±3°, desirably within a range of 90°±1°, more desirably a range of 90°±0.5°, and particularly desirably 90° (perfectly orthogonal).

In this specification, two axes (directions) forming an angle of 45° indicate that an angle (absolute value) formed by the two axes is within a range of 45°±3°, desirably within a range of 45°±1°, more desirably a range of 45°±0.5°, and particularly desirably 45° (perfectly 45°).

First Embodiment

FIG. 1(a) is a cross-sectional schematic diagram that illustrates a liquid crystal display device of a first embodiment, and FIG. 1(b) is a cross-sectional schematic diagram that illustrates one example of a configuration of a second substrate. As illustrated in FIG. 1(a), the liquid crystal display device of the first embodiment includes a backlight 3 and a liquid crystal display panel 10. The backlight 3 is positioned on a back surface side, and the liquid crystal display panel 10 is positioned on an observation surface side. The light amount, which is transmitted through the liquid crystal display panel 10, of the light emitted by the backlight 3 is controlled by an applied voltage to a liquid crystal layer 17 provided in the liquid crystal display panel 10.

The type of the backlight 3 is not particularly limited. For example, an edge light type, a direct type, and so forth may be raised. The kind of a light source of the backlight 3 is not particularly limited. For example, a light emitting diode (LED), a cold cathode fluorescent lamp (CCFL), and so forth may be raised.

In order from the observation surface side to the back surface side, the liquid crystal display panel 10 includes a first linear polarizer 11, a first λ/4 retardation layer 31, a first substrate 13, a color filter layer 14 and black matrices BL, an overcoat layer 15, a second λ/4 retardation layer 32, the liquid crystal layer 17, a second substrate 18, and a second linear polarizer 19.

Note that the liquid crystal display panel 10 may include other configuration members. For example, an antireflection film is provided on the observation surface side of the first linear polarizer 11, and the reflectance of the liquid crystal display panel 10 may thereby further be reduced. As the antireflection film, a moth-eye film that has a moth-eye-like surface structure is preferably used.

Further, a transparent electrode (not illustrated) may be provided on the observation surface side of the first substrate 13. Such a transparent electrode may be referred to as back side ITO and prevents a defect caused by electrification. Further, a sensor of a touch panel may be provided on the observation surface side of the first substrate 13.

As the first linear polarizer 11 and the second linear polarizer 19, for example, a polarizer (absorption type polarizer) may be used, in which dying and adsorption with an anisotropic material such as an iodine complex (or dye) are performed for a polyvinyl alcohol (PVA) film and stretch alignment is thereafter performed. Note that usually, in order to secure mechanical intensity and moist-heat resistance, protection films such as triacetylcellulose (TAC) films are laminated on both sides of the PVA film, and the PVA film is thereafter provided for practical use.

A transmission axis of the first linear polarizer 11 and a transmission axis of the second linear polarizer 19 are desirably orthogonal. In such a configuration, because the first linear polarizer 11 and the second linear polarizer 19 are in crossed Nicol arrangement, a proper black display state may be realized in a case where no voltage is applied. In the following, a description will be made while the azimuthal direction of the transmission axis of the first linear polarizer 11 is defined as 0°. In this case, the azimuthal direction of the transmission axis of the second linear polarizer 19 is desirably set to 90°.

As the first substrate 13 and the second substrate 18, for example, a glass substrate, a plastic substrate, and so forth may be raised. On the liquid crystal layer 17 side of the second substrate 18, an electrode pair (a pair of electrodes) is provided, which generates a transverse electric field in the liquid crystal layer 17 by a voltage being applied. As a liquid crystal driving mode of the liquid crystal display device of this embodiment, a fringe field switching (FFS) mode and an in-plane switching (IPS) mode may be raised. In the following, a case where the second substrate 18 is a thin-film transistor array substrate for the FFS mode that includes a combination of a planar electrode and a comb-shaped electrode as the electrode pair will be exemplified with reference to FIG. 1(b).

As illustrated in FIG. 1(b), the second substrate 18 includes a support substrate 21, a common electrode (planar electrode) 22 that is arranged on a surface on the liquid crystal layer 17 side of the support substrate 21, an insulating film 23 that covers the common electrode 22, and a pixel electrode (comb-shaped electrode) 24 that is arranged on a surface on the liquid crystal layer 17 side of the insulating film 23. In such a configuration, a voltage is applied between the common electrode 22 and the pixel electrode 24 that configure the electrode pair, and a transverse electric field (fringe electric field) may thereby be generated in the liquid crystal layer 17. Thus, the voltage applied between the common electrode 22 and the pixel electrode 24 is adjusted, and the alignment of liquid crystals in the liquid crystal layer 17 may thereby be controlled. Note that in order to enable the amounts of colored light transmitted through a red color filter 14R, a green color filter 14G, and a blue color filter 14B to be individually controlled, the common electrode 22 includes a red common electrode 22R, a green common electrode 22G, and a blue common electrode 22B, and the pixel electrode 24 includes a red pixel electrode 24R, a green pixel electrode 24G, and a blue pixel electrode 24B.

As the support substrate 21, for example, a glass substrate, a plastic substrate, and so forth may be raised. As materials of the common electrode 22 and the pixel electrode 24, for example, indium tin oxide (ITO), indium zinc oxide (IZO), and so forth may be raised. As a material of the insulating film 23, for example, an organic insulating film, a nitride film, and so forth may be raised.

Further, in the second substrate 18, a horizontal alignment film (not illustrated) is arranged to cover the pixel electrode 24. As the horizontal alignment film, a known horizontal alignment film in related art may be used.

In the above, a case where the second substrate 18 is a thin-film transistor array substrate of the FFS mode is exemplified. However, a thin-film transistor array substrate of the IPS mode as the same transverse electric field mode includes a combination of a comb-shaped electrode and a comb-shaped electrode as an electrode pair, applies a voltage between the pair of comb-shaped electrodes, thereby generates a transverse electric field in the liquid crystal layer 17, and may thereby control the alignment of liquid crystals in the liquid crystal layer 17.

The color filter layer 14 has a configuration in which the red color filter 14R, the green color filter 14G, and the blue color filter 14B are disposed in a plane. Further, the red color filter 14R, the green color filter 14G, and the blue color filter 14B are demarcated by the black matrices BL. The red color filter 14R, the green color filter 14G, the blue color filter 14B, and the black matrix BL are configured with transparent resin that contains pigments, for example. Usually, a combination of the red color filter 14R, the green color filter 14G, and the blue color filter 14B is arranged in every pixel, and a desired color may be obtained by controlling the amounts of colored light transmitted through the red color filter 14R, the green color filter 14G, and the blue color filter 14B and mixing the colors. The region that overlaps with the red color filter 14R corresponds to a red sub-pixel (R sub-pixel), the region that overlaps with the green color filter 14G corresponds to a green sub-pixel (G sub-pixel), and the region that overlaps with the blue color filter 14B corresponds to a blue sub-pixel (B sub-pixel). The red sub-pixel, the green sub-pixel, and the blue sub-pixel may have the same configuration except that the colors of the color filters to be arranged are different.

The overcoat layer 15 covers a surface on the liquid crystal layer 17 side of the color filter layer 14. The overcoat layer 15 is provided, and impurities in the color filter layer 14 may thereby be prevented from being eluted into the liquid crystal layer 17. As a material of the overcoat layer 15, transparent resin is preferable. Note that a configuration is possible in which the overcoat layer 15 is omitted and the second λ/4 retardation layer 32 is arranged directly on the color filter layer 14, and a configuration is also possible in which the second λ/4 retardation layer 32 is arranged between the color filter layer 14 and the overcoat layer 15.

The liquid crystal layer 17 contains liquid crystals that are horizontally aligned in a case where no voltage is applied. Horizontal alignment films (not illustrated) that regulate alignment of liquid crystals are arranged on surfaces between which the liquid crystal layer 17 is held. The liquid crystals in the liquid crystal layer 17 are horizontally aligned by regulation force of the horizontal alignment film in a state where a voltage is not applied between the electrode pair provided on the second substrate 18 side (in a case where no voltage is applied) and rotate in an in-plane direction in accordance with the transverse electric field generated in the liquid crystal layer 17 in a state where a voltage is applied between the electrode pair (in a case where voltage is applied).

The liquid crystal display device of this embodiment includes a combination of the first λ/4 retardation layer 31 and the second λ/4 retardation layer 32. The first λ/4 retardation layer 31 is a λ/4 retardation layer that is arranged on the outside (observation surface side) of the first substrate 13 when the liquid crystal layer 17 is set as a reference and will hereinafter also be referred to as "out-cell λ/4 plate" because a λ/4 retardation layer is commonly referred to as λ/4 plate for short. Meanwhile, the second λ/4 retardation layer 32 is a λ/4 retardation layer that is arranged on the inside (back surface side) of the first substrate 13 when the liquid crystal layer 17 is set as a reference and will hereinafter also be referred to as "in-cell λ/4 plate" because a λ/4 retardation layer is commonly referred to as λ/4 plate for short.

A polarizer on the observation surface side in the FFS mode in related art is configured only with the first linear polarizer 11. However, in this embodiment, the polarizer on the observation surface side is configured with a combination of the first linear polarizer 11 and the out-cell λ/4 plate 31 and functions as a circular polarizer as a whole. Accordingly, internal reflection of the liquid crystal display panel 10 (more accurately, of a color filter substrate) may be prevented.

Further, because black display may not be performed by circularly-polarizing FFS mode liquid crystals in which only the out-cell λ/4 plate 31 is incorporated in FFS mode liquid crystals in related art, the liquid crystal display device of this embodiment is further provided with the in-cell λ/4 plate 32 and thereby improves the performance of the circularly-polarizing FFS mode liquid crystals. That is, the color filter substrate is interposed between two orthogonal λ/4 plates, and it thereby becomes possible to perform black display while external light reflection of the color filter substrate is inhibited and the same optical principle as the FFS mode liquid crystals in related art is used for illumination light from the backlight 3.

In order to obtain the above effect, axis arrangement and design of retardation values are performed such that the out-cell λ/4 plate 31 and the in-cell λ/4 plate 32 cancel out the retardations of each other. The out-cell λ/4 plate 31 has an in-plane slow axis in a first direction, and the in-cell λ/4 plate 32 has an in-plane slow axis in a second direction that is orthogonal to the first direction. That is, the in-plane slow axis of the out-cell λ/4 plate 31 is orthogonal to the in-plane slow axis of the in-cell λ/4 plate 32. In such axis arrangement, the out-cell λ/4 plate 31 and the in-cell λ/4 plate 32 may cancel out the retardations of each other with respect to the light incident from the normal direction of the liquid crystal display panel 10, and a state where substantially neither of them optically exists may thereby be realized. That is, with respect to the light incident on the liquid crystal display panel 10 from the backlight 3, a configuration that is optically equivalent to a liquid crystal display panel of a transverse electric field mode in related art is realized. Thus, display by a transverse electric field mode by using a circular polarizer may be realized.

In view of bringing about functions of the retardation layers, the first direction and the second direction desirably form an angle of 45° with respect to the transmission axis of the first linear polarizer 11 and the transmission axis of the second linear polarizer 19. That is, as for the first direction and the second direction, it is desirable that one be an azimuthal direction of 45° and the other be an azimuthal direction of 135°. For example, it is desirable that the first direction be an azimuthal direction of 45° and the second direction be an azimuthal direction of 135°.

As desirable arrangement of optical axes in this embodiment, for example, given that the azimuthal direction of the transmission axis of the first linear polarizer 11 is 0°, the in-plane slow axis of the out-cell λ/4 plate 31 is 45° azimuthal direction, the in-plane slow axis of the in-cell λ/4 plate 32 is 135° azimuthal direction, the initial alignment direction of the liquid crystals of the liquid crystal layer 17 is 0° or 90°, and the azimuthal direction of the transmission axis of the second linear polarizer 19 is 90°.

The in-cell λ/4 plate 32 is configured with a different material from the out-cell λ/4 plate 31. Based on a common manufacturing method of the liquid crystal display panel 10, the color filter layer 14, the overcoat layer 15, and the in-cell λ/4 plate 32 are sequentially formed on one surface of the first substrate 13. However, in this specification, a laminated body of the first substrate 13, the color filter layer 14, and the overcoat layer 15 is referred to as "color filter substrate". Further, the first linear polarizer 11 and the out-cell λ/4 plate 31 are adhered onto the other surface of the first substrate 13 in the color filter substrate. In such a manner, because the in-cell λ/4 plate 32 and the out-cell λ/4 plate 31 are usually formed through different manufacturing processes, an advantage in reliability and productivity is obtained by forming the in-cell λ/4 plate 32 and the out-cell λ/4 plate 31 from different materials.

On the other hand, as a problem in a case where the in-cell λ/4 plate 32 and the out-cell λ/4 plate 31 are configured with different materials, difference in wavelength dispersion characteristic between the in-cell λ/4 plate 32 and the out-cell λ/4 plate 31 may be raised.

Here, "a wavelength dispersion characteristic of a retardation layer" indicates the correlation between the magnitude of the retardation given by the retardation layer and the wavelength of incident light. A characteristic that the magnitude of the retardation given by a retardation layer does not change in the visible light range even if the wavelength of incident light changes is referred to as "flat wavelength dispersion". Further, a characteristic that the magnitude of the retardation given by a retardation layer becomes smaller in the visible light range as the wavelength of incident light becomes longer is referred to as "positive wavelength dispersion". The retardation of a retardation layer is calculated from the product of a birefringence index Δn and a thickness d of a retardation layer.

In this specification, given that the birefringence index with respect to light at a wavelength of λ nm is set as Δn(λ), a material that satisfies the following formulas (1) and (2) is referred to as "flat wavelength dispersion material".

$$0.99 < \Delta n(450 \text{ nm})/\Delta n(550 \text{ nm}) < 1.03 \quad (1)$$

$$0.98 < \Delta n(650 \text{ nm})/\Delta n(550 \text{ nm}) < 1.01 \quad (2)$$

In this specification, given that the birefringence index with respect to light at a wavelength of λ nm is set as Δn(λ), a material in which Δn(450 nm)/Δn(550 nm) is 1.03 or greater and Δn(650 nm)/Δn(550 nm) is 0.98 or less is referred to as "positive wavelength dispersion material".

As described above, because the out-cell λ/4 plate 31 and the in-cell λ/4 plate 32 cancel out the retardations of each other, light leakage in a case of black display may occur when the retardation values of the two λ/4 plates 31 and 32 do not accurately agree with each other. In a case where the wavelength dispersion characteristics are different, the agreement degree of the retardation values is different with respect to each wavelength of incident light, and light is thus colored.

A material of the out-cell λ/4 plate 31 is not particularly limited. However, because the out-cell λ/4 plate 31 may be formed by adhesion to the color filter substrate, a macromolecule film is preferably used which is commonly used in the field of liquid crystal display device and for which stretching process is performed. As materials of the macromolecule film, for example, cycloolefin polymer, polycarbonate, polysulfone, polyethersulfone, polyethylene terephthalate, polyethylene, polyvinyl alcohol, norbornene, triacetylcellulose, diacetylcellulose, and so forth may be raised. Among those, cycloolefin polymer is particularly desirable. A retardation layer formed of cycloolefin polymer has an advantage that durability is high and the change in the retardation is small in a case of being exposed to a high temperature environment or a high temperature and high moisture environment for a long period. As a film of cycloolefin polymer, "ZEONOR® film" from Zeon Corporation, "ARTON® film" from JSR Corporation, and so forth have been known.

A material of the in-cell λ/4 plate 32 is not particularly limited. However, a cured product of a reactive liquid crystal polymer (also referred to as "reactive mesogen") is preferably used. Because the reactive liquid crystal polymer is used and coating formation of the in-cell λ/4 plate 32 may thereby be performed in a manufacturing process of the color filter substrate, the liquid crystal display panel 10 may be made thin.

As the reactive liquid crystal polymer, a liquid crystalline polymer that has a photoreactive group is preferably used. As the liquid crystalline polymer that has a photoreactive group, for example, a polymer which has a biphenyl group, a terphenyl group, a naphthalene group, a phenylbenzoate group, an azobenzene group, or a substituent such as a derivative of those (a mesogen group), or which has a side chain of a structure having any combination of photoreactive groups such as a cinnamoyl group, a chalcone group, a cinnamylidene group, a β-(2-phenyl)-acryloyl group, a cinnamic acid group, and a derivative of those and has a main chain of a structure such as acrylate, methacrylate, maleimide, N-phenylmaleimide, or siloxane may be raised. Such a polymer may be a homopolymer formed of a single type of repeat unit or may be a copolymer formed of two or more types of repeat units with different side chain structures. Such a copolymer includes all of alternating copolymers, random copolymers, graft copolymers, and so forth. Further, such a copolymer may be a copolymer in which a side chain related to at least one repeat unit is a side chain of a structure having any combination of the above-described mesogen group and photoreactive group and a side chain related to another repeat unit does not have a mesogen group or a photoreactive group.

Solvents used for coating with the reactive liquid crystal polymer, for example, toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxybutyl acetate, N-methylpyrrolidone, dimethylacetamide, and so forth may be raised. Any of those may be used alone, and two or more kinds may be used in combination.

The retardation layer that uses the reactive liquid crystal polymer may specifically be formed by the following method. First, a base alignment film is formed on the color filter substrate, an alignment process such as rubbing or light radiation is performed, and the alignment direction is defined. The base alignment film for which the alignment process is performed is coated with the reactive liquid crystal polymer, and the reactive liquid crystal polymer is cured by a method such as baking or light radiation. The cured reactive liquid crystal polymer is aligned in accordance with the alignment direction of the base alignment film and functions as a retardation layer. The retardation of the retardation layer is determined by the product of the birefringence index Δn of the reactive liquid crystal polymer and the thickness d of the retardation layer. Further, as a formation method of the retardation layer on the color filter substrate, a method may be used in which a transfer film in which the layer of the cured product of the reactive liquid crystal polymer is provided on a substrate film such as a PET film is used to transfer the layer of the cured product of the reactive liquid crystal polymer to the color filter substrate.

Note that it is possible to form the out-cell λ/4 plate 31 with the reactive liquid crystal polymer. As a method of forming the out-cell λ/4 plate 31 with the reactive liquid crystal polymer, a method in which film formation is performed by coating a flat substrate film such as a PET film with a material, the obtained film is thereafter transferred to a linear polarizer or a liquid crystal display panel via an adhesive, and the substrate film is finally peeled off or a method in which film formation is performed by directly coating an outer side (a surface on an observer side) of the color filter substrate with a material may be used. Further, it is possible to form the in-cell λ/4 plate 32 with a stretched macromolecule film.

The wavelength dispersion characteristic of the birefringence index Δn of a reactive liquid crystal polymer that is preferable for the in-cell λ/4 plate 32 is positive wavelength dispersion. Consequently, in order to accurately cancel out the retardation of the in-cell λ/4 plate 32 formed of the reactive liquid crystal polymer throughout all wavelengths and realize proper black display, use of a positive wavelength dispersion material for the out-cell λ/4 plate 31 is usual, and a reactive liquid crystal polymer may be used similarly to the in-cell λ/4 plate 32. However, it was found that the out-cell λ/4 plate 31 formed of the reactive liquid crystal polymer had lower heat resistance than the in-cell λ/4 plate 32 formed of the same reactive liquid crystal polymer and the retardation was likely to lower in a high temperature environment. For example, in a case where the liquid crystal display panel was preserved at 80° C. for 500 hours, there was a case where the retardation of the in-cell λ/4 plate 32 did not change but the retardation of the out-cell λ/4 plate 31 lowered by approximately 3%. This is surmised to be because the in-cell λ/4 plate 32 is formed in a manufacturing process of the liquid crystal display panel and thus undergoes a high temperature process such as formation of a photo spacer (PS) for retaining a cell thickness or baking of an alignment film, for example, before adhesion of the out-cell λ/4 plate 31 and the retardation of the in-cell λ/4 plate 32 becomes a sufficiently stable state where the retardation lowers no more in the manufacturing process of the liquid crystal display panel. In contrast, the out-cell λ/4 plate 31 is not involved in the high temperature process in order to avoid occurrence of a problem such as degradation of the first linear polarizer 11. Consequently, in a case where a durability test of the liquid crystal display panel is performed, because the retardation of the out-cell λ/4 plate 31 lowers although the retardation of the in-cell λ/4 plate 32 does not change, in the liquid crystal display panel after the test, the out-cell λ/4 plate 31 and the in-cell λ/4 plate 32 may not cancel out the retardations of each other, and light leakage occurs.

On the other hand, in a case where the out-cell λ/4 plate 31 is formed of highly heat-resistant cycloolefin polymer, light leakage may be prevented from occurring after a heat resistance test. However, cycloolefin polymer is a flat wavelength dispersion material and thus has difficulty in accurately canceling out the retardation of the in-cell λ/4 plate 32 formed of a positive wavelength dispersion material such as a reactive liquid crystal polymer throughout all wavelengths. Thus, in a case where the liquid crystal display device performs black display, light leakage at a specific wavelength occurs from a display surface of the liquid crystal display device, and black display is colored in blue, for example.

Accordingly, in this embodiment, a more yellowish backlight than related art is used to inhibit black display from being colored in blue. When the color of light emitted from the backlight is expressed by chromaticity coordinates (x, y) of an XYZ color system, both of x and y are 0.32 or greater.

On the other hand, in a case where the more yellowish backlight than related art is used, another problem occurs: white display, which is basically desirably achromatic, is colored in yellow. Accordingly, in this embodiment, control of the sub-pixels of red (R), green (G), and blue (B) is performed by using a different voltage driving method from related art, and yellowness of white display in a case where the more yellowish backlight than related art is used is thereby reduced.

In this embodiment, voltages are applied to plural electrode pairs, and a transverse electric field is thereby generated in the liquid crystal layer 17. The plural electrode pairs are respectively provided to the sub-pixels such that the light transmittance (hereinafter simply referred to as "transmittance" also) of the sub-pixels of the respective colors may individually be controlled and include a red electrode pair arranged in the red sub-pixel, a green electrode pair arranged in the green sub-pixel, and a blue electrode pair arranged in the blue sub-pixel. In a voltage driving method in related art, in a case of white display, applied voltages to the red electrode pair, the green electrode pair, and the blue electrode pair are set the same. However, in the voltage driving method in this embodiment, control is performed such that a white display applied voltage of the blue electrode pair is different from the white display applied voltage of the red electrode pair and the white display applied voltage of the green electrode pair. Accordingly, yellowness of white display due to use of the more yellowish backlight than related art may be reduced.

As illustrated in FIG. 1(b), the red electrode pair is a pair of red common electrode 22R and red pixel electrode 24R, the green electrode pair is a pair of green common electrode 22G and green pixel electrode 24G, and the blue electrode pair is a pair of blue common electrode 22B and blue pixel electrode 24B. The red common electrode 22R, the green common electrode 22G, and the blue common electrode 22B may be electrically independent from each other, may be electrically connected with each other, or may be portions included in one common electrode 22 as illustrated in FIG. 1(b).

Here, a description will be made about a voltage driving method of a common liquid crystal display device in related art. Liquid crystals have a characteristic that the alignment of molecules is changed by an electric field and the transmittance of light is changed. A liquid crystal display device (LCD) applies the characteristic of liquid crystals to a display. Specifically, a liquid crystal material is interposed between two substrates, and the light is caused to pass through R, G, and B color filters, and expression of colors is thereby performed. In order to use this principle for a display, scanning lines and data lines are arranged on the substrate in a lattice manner, and thin film transistors (TFT) are built on the intersection points and used as switches for pixels. The scanning line and the data line are respectively connected to a gate of the TFT and a source of the TFT, and the TFT is driven by an LCD driver arranged at a display end. A gate driver sequentially outputs a pulse-like voltage waveform to the scanning lines so as to turn ON the TFTs in order from top. A source driver supplies a voltage to be applied to the liquid crystals (electrode pairs) through the TFTs that are turned ON. In this case, the transmittance of light changes in accordance with the applied voltage.

Next, a description will be made about an operation of a common source driver in related art. First, data of the color to be displayed are received from a timing controller (T-CON). As data of a color, 8-bit digital data are the mainstream. Next, color data received from the T-CON are converted into an analog voltage. Because a gamma characteristic that represents the relationship between an applied voltage and transmittance is different in accordance with liquid crystal materials and so forth, a driver has a digital analog converter (DAC) that corresponds to the gamma characteristic of each LCD. Then, impedance variation is performed for the analog voltage produced by the DAC by an operational amplifier, and the analog voltage is output to a panel. This voltage is applied to each pixel through the TFT on the panel. The TFT is turned OFF when a desired voltage is written in each pixel, and this voltage is retained by capacities that the liquid crystals themselves have until the next writing.

In the above-described voltage driving method of a common liquid crystal display device in related art, it is assumed that the applied voltages to the red electrode pair, the green electrode pair, and the blue electrode pair are the same in a case of white display. On the other hand, in the voltage driving method in this embodiment, control is performed such that the white display applied voltage of the blue electrode pair is different from the white display applied voltage of the red electrode pair and the white display applied voltage of the green electrode pair. It is possible to carry out such control by using known techniques in related art, and methods are not particularly limited. However, for example, a method may be exemplified in which a driver which has an independent gamma characteristic for each of red, green, and blue is prepared. Alternatively, a method may be exemplified in which a gamma characteristic is not provided to a driver, a correspondence table of an independent gamma characteristic for each of red, green, and blue, so-called a look up table (LUT), is provided to the T-CON, the gamma characteristic is converted in the T-CON and then transferred to the driver.

In the voltage driving method of this embodiment, in order to reduce yellowness of white display, it is desirable to increase the ratio of the transmittance of the blue sub-pixel to the total of the transmittance of the red sub-pixel, the transmittance of the green sub-pixel, and the transmittance of the blue sub-pixel (hereinafter also referred to as "relative transmittance of the blue sub-pixel"), which contribute to white display. As a method for increasing the relative transmittance of the blue sub-pixel, a first adjustment method for increasing the transmittance of the blue sub-pixel, a second adjustment method for reducing the transmittance of red and/or green sub-pixels other than the blue sub-pixel, a third method that uses the first method and the second method in combination may be raised. The third adjustment method is preferable among those.

The transmittance of the liquid crystal display panel increases or decreases when the applied voltage to the electrode pair changes. The relationship between the applied voltage and the transmittance in the liquid crystal display panel is represented by a correlation curve between applied voltage and transmittance (V-T curve) (for example, see FIGS. 17 to 19). For example, in a case where all of the white display applied voltage of the blue electrode pair, the white display applied voltage of the red electrode pair, and the white display applied voltage of the green electrode pair are included in a voltage region in which the light transmittance of the liquid crystal display panel monotonously increases with respect to an increase in the voltage, the white display applied voltage of the blue electrode pair is set to a higher voltage than the white display applied voltage of the red electrode pair and the white display applied voltage of the green electrode pair, and the relative transmittance of the blue sub-pixel may thereby be increased.

As described above, the liquid crystal display device of this embodiment may prevent light leakage and coloring observed on the display surface in both of white display and black display. Because contrast of the liquid crystal display device under a particularly dark use environment may be enhanced by prevention of light leakage, enhancement of viewability of liquid crystal display and low power consumption by an improvement in use efficiency of light of the backlight (extension of battery run time) may be intended. Further, by prevention of coloring, display quality in a display state may be enhanced, and an improvement in designability (design quality) of the liquid crystal display device may be intended by making a boundary between a screen and a frame less noticeable in a non-display situation. All of those effects are important factors in improving marketability of the liquid crystal display device.

In the following, a design concept of the liquid crystal display panel 10 of this embodiment will be described in detail with reference to simulation results.

First, a desirable retardation range of the in-cell λ/4 plate 32 in a circularly-polarizing FFS mode liquid crystals that used the in-cell λ/4 plate 32 was studied by calculation. A commercially available liquid crystal simulator ("LCD Master" from Shintech) was used for calculation. Note that calculation results are applicable to circularly-polarizing IPS mode liquid crystals.

The configuration of a circularly-polarizing FFS mode liquid crystal panel used for the study is as illustrated in FIG. 1. A difference of the circularly-polarizing FFS mode liquid crystal panel used for the study from common FFS mode liquid crystals in related art is inclusion of the out-cell λ/4 plate 31 and the in-cell λ/4 plate 32. Inclusion of the out-cell λ/4 plate 31 and the in-cell λ/4 plate 32 makes a polarizer on the observer side become a circular polarizer, and internal reflection of the liquid crystal display panel (more accurately, of the color filter substrate) may be prevented. Further, in order to remove a disadvantage that black display may not be performed due to an effect of the out-cell λ/4 plate 31 which configures the circular polarizer, the in-cell λ/4 plate 32 is provided so as to cancel out the retardation of the out-cell λ/4 plate 31. In other words, the color filter substrate is interposed between two λ/4 plates whose in-plane slow axes are orthogonal to each other. Accordingly, it becomes possible to perform black display while external light reflection of the color filter substrate is inhibited and the same optical principle as the FFS mode liquid crystals in related art is used for illumination light from the backlight. When the retardation values of the two λ/4 plates do not accurately agree with each other, light leakage is caused in a case of black display. Further, when the agreement degree is different at each wavelength, coloring is caused.

The in-cell λ/4 plate 32 is formed by coating with a reactive liquid crystal polymer (reactive mesogen). Because the wavelength dispersion of birefringence index Δn of the reactive liquid crystal polymer is so-called positive wavelength dispersion in which the absolute value becomes smaller as the wavelength becomes longer, when a flat color filter substrate is coated with the reactive liquid crystal polymer at a uniform film thickness, the wavelength dispersion of the retardation becomes positive wavelength dispersion.

In order to accurately cancel out the retardation of the in-cell λ/4 plate 32 throughout all wavelengths and realize proper black display, using a positive wavelength dispersion material for the out-cell λ/4 plate 31 is usual. This may be realized by using a reactive liquid crystal polymer similarly to the in-cell λ/4 plate 32. First, a black display state in this basic configuration was reproduced by the simulator.

Parameters used in simulations are as follows.

Figure 2:
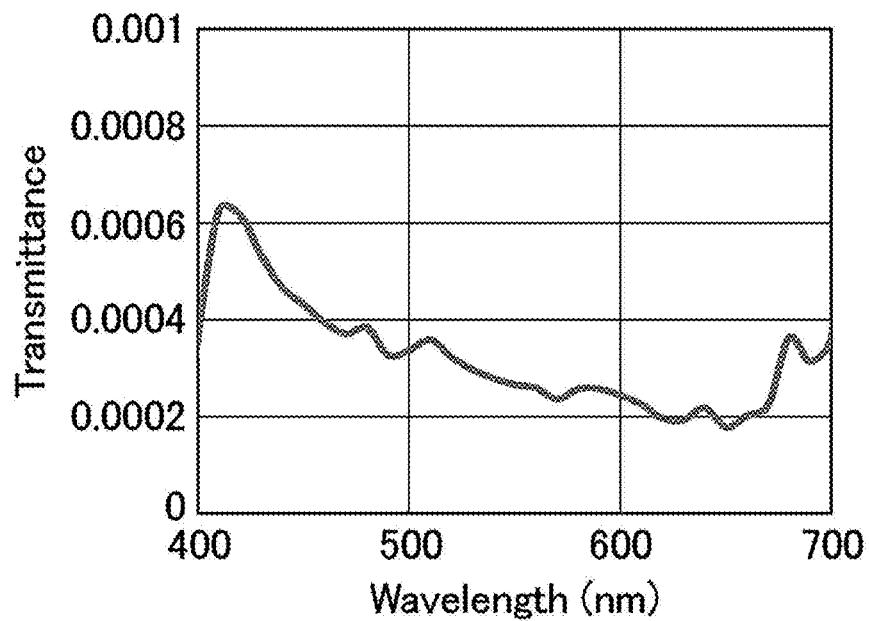
FIG. 2 is a graph that represents a transmission spectrum of a crossed Nicol polarizer.
Figure 3:
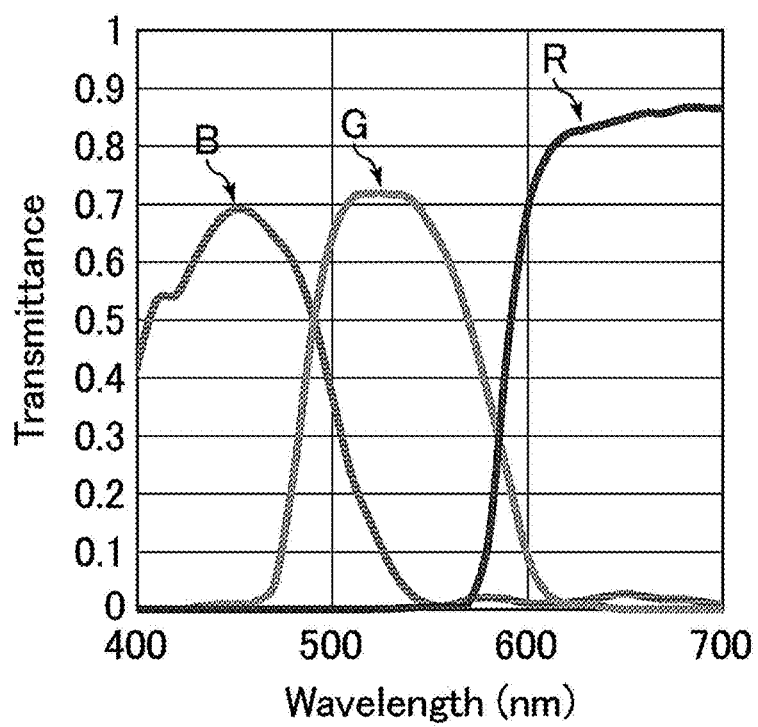
FIG. 3 is a graph that represents transmission spectra of color filter layers (B, G, and R).
Figure 4:
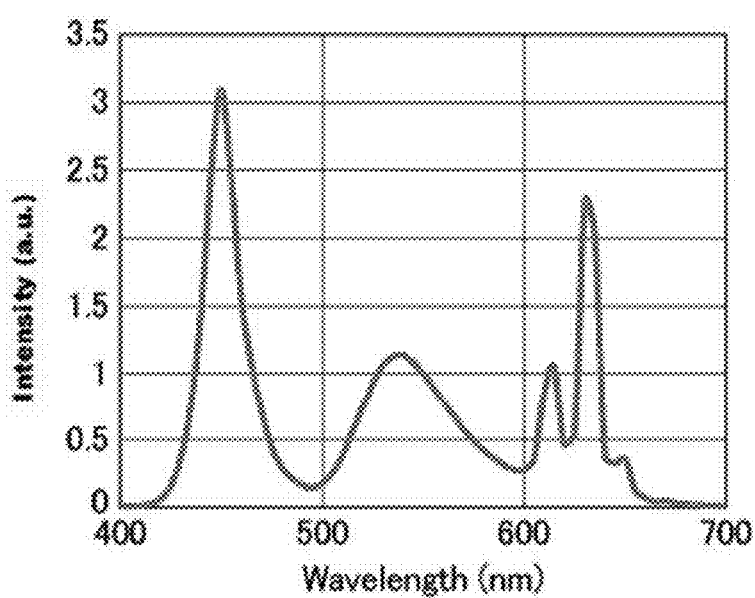
FIG. 4 is a graph that represents a light emission spectrum of an LED backlight for a common liquid crystal display in related art.

The birefringence index Δn and the wavelength dispersion of the reactive liquid crystal polymer as the material of the in-cell λ/4 plate 32 and the out-cell λ/4 plate 31 were assumed to be Δn(550 nm)=0.10, Δn(450 nm)/Δn(550 nm)=1.12, and Δn(650 nm)/Δn(550 nm)=0.96. The transmission spectrum of a crossed Nicol polarizer was as illustrated in FIG. 2. The transmission spectra of color filter layers (B, G, and R) were as illustrated in FIG. 3. The area for each color of B, G, and R was set equivalent. FIG. 4 is a graph which represents a light emission spectrum of an LED backlight for a common liquid crystal display in related art and which was used for calculation of visibility-corrected transmittance Y and chromaticity coordinates (x, y). Note that FIG. 4 is depicted while standardization is performed such that the intensity at a wavelength of 550 nm becomes 1. An overcoat layer is commonly transparent and does not have a retardation (birefringence) and was thus ignored in the simulations. A horizontally aligned liquid crystal layer has a retardation (birefringence). However, because the alignment direction is set to be parallel with or orthogonal to the azimuthal direction of the axis of a polarizer on the back surface side, the liquid crystal layer was also ignored in the simulations. The aperture ratios of a TFT substrate and the color filter substrate do not actually become 100% but were supposed to be 100% in the simulations for simplicity. Summarizing the above, the parameters requested for the simulations are the polarizers, the color filter layer, the spectrum of a light source, and the birefringence Δn (or the retardation value that is determined by the product of the birefringence index Δn and the film thickness d) of the reactive liquid crystal polymer as the material of the in-cell λ/4 plate 32 and the out-cell λ/4 plate 31.

(First Simulation)

When calculation was performed with only the linear polarizers and the color filter layer being configuration elements, the transmittance Y for which visibility correction was performed was 0.000073, and the chromaticity coordinates (x, y) were (0.243, 0.218). The obtained values correspond to the characteristics in an ideal case where cancel between the retardations of the in-cell λ/4 plate 32 and the out-cell λ/4 plate 31 is perfectly performed and will thus be referred to as the target values in the following.

(Second Simulation)

Figure 5:
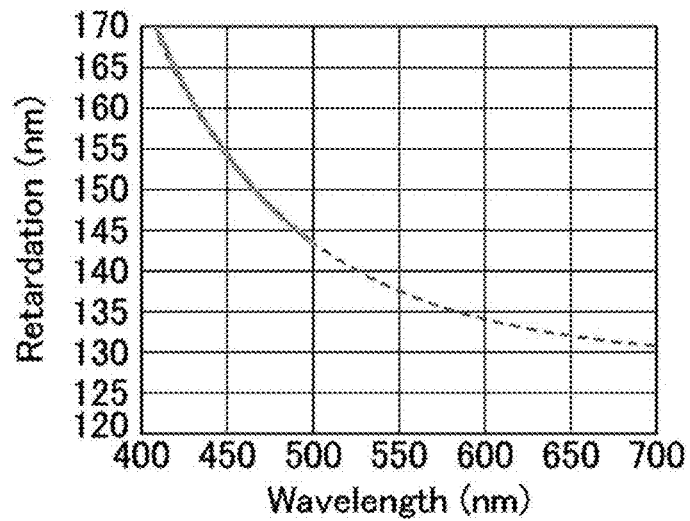
FIG. 5 is a graph that represents retardation wavelength dispersion of a B region of an in-cell $\lambda/4$ plate (positive wavelength dispersion material) with a uniform film thickness of d=1.375 μm, which was used in a second simulation.
Figure 6:
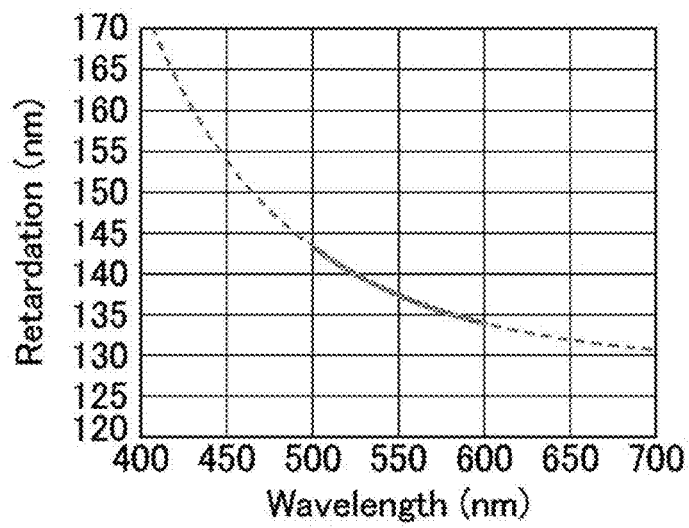
FIG. 6 is a graph that represents the retardation wavelength dispersion of a G region of the in-cell λ/4 plate (positive wavelength dispersion material) with a uniform film thickness of d=1.375 μm, which was used in the second simulation.
Figure 7:
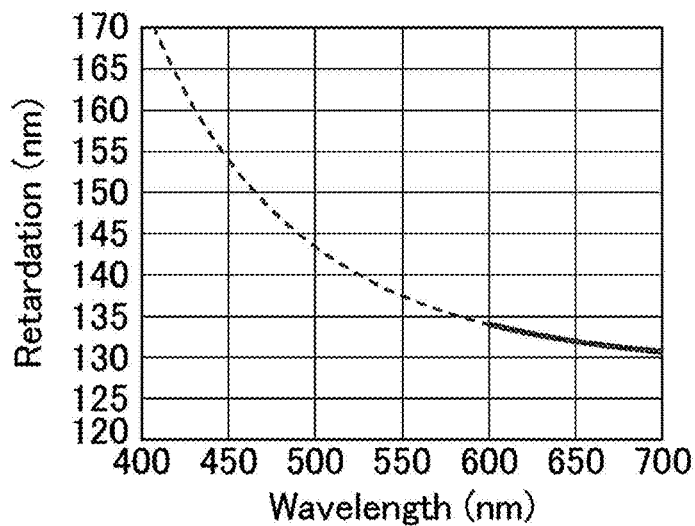
FIG. 7 is a graph that represents the retardation wavelength dispersion of an R region of the in-cell λ/4 plate (positive wavelength dispersion material) with a uniform film thickness of d=1.375 μm, which was used in the second simulation.
Figure 8:
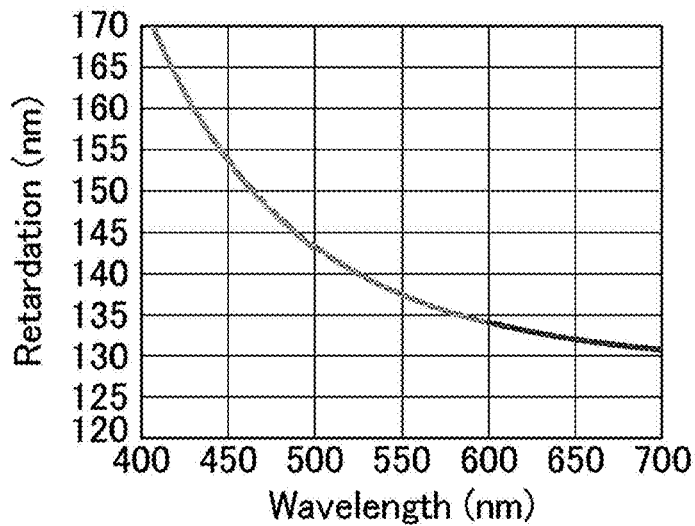
FIG. 8 is a graph that is created by patching together the retardations of the B, G, and R regions illustrated in FIGS. 5 to 7 and represents the retardation wavelength dispersion of an in-cell λ/4 plate.

In a case where the in-cell λ/4 plate 32 at a uniform film thickness d=1.375 μm is provided on a flat color filter substrate, the retardation wavelength dispersion of B, G, and R regions is as illustrated in FIGS. 5 to 7. The retardation of the blue color filter in the range of wavelength of 400 to 500 nm, the retardation of the green color filter in the range of wavelength of 500 to 600 nm, and the retardation of the red color filter in the range of wavelength of 600 to 700 nm that are patched together for convenience and illustrated in one graph become FIG. 8.

Note that as illustrated in FIG. 3, the spectral characteristics of actual color filter layers are not perfect, but there are overlaps among the colors. For example, the blue color filter desirably enables only blue light (commonly light of a wavelength of approximately 380 to 500 nm) to pass through but actually enables green light of a wavelength of approximately 500 to 550 nm to be transmitted through. Consequently, an in-cell retardation layer provided on the blue color filter functions not only for incident light of a wavelength of 380 to 500 nm but also for incident light of a wavelength of 500 to 550 nm, for example. Taking this into consideration, the above patched graph may not accurately represent the characteristics of the whole in-cell λ/4 plate 32 provided on the color filter layer but is useful for rough understanding of the characteristics and will be used in this specification for this purpose.

Figure 9:
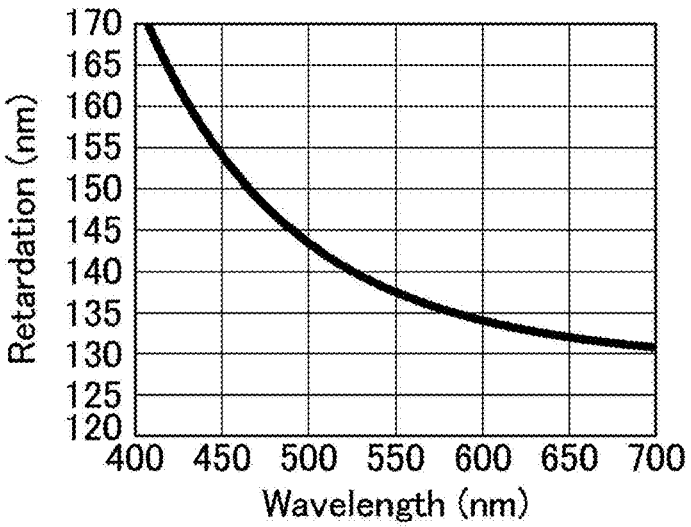
FIG. 9 is a graph that represents the retardation wavelength dispersion of an out-cell λ/4 plate (positive wavelength dispersion material), which was used in the second simulation.

In order to suit the wavelength dispersion characteristics of the in-cell λ/4 plate 32 and the out-cell λ/4 plate 31 to each other, the same positive wavelength dispersion material (reactive liquid crystal polymer) as the in-cell λ/4 plate 32 was used to provide the out-cell λ/4 plate 31 at a uniform film thickness d=1.375 μm. The retardation wavelength dispersion is as illustrated in FIG. 9.

Figure 10:
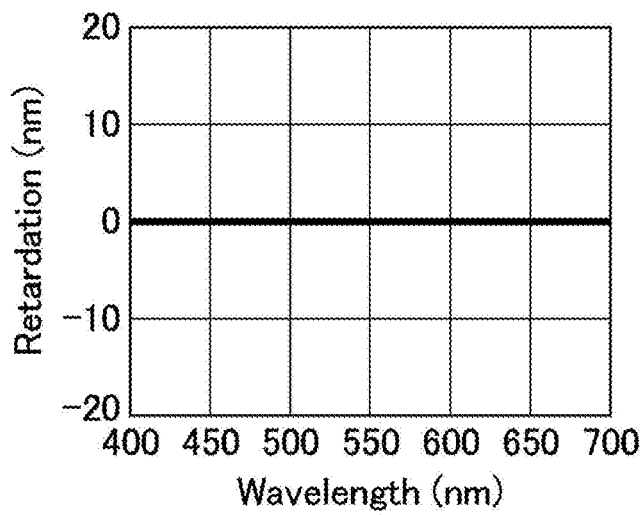
FIG. 10 is a graph that represents the difference between the retardation of the in-cell λ/4 plate and the retardation of the out-cell λ/4 plate, which were used in the second simulation.
Figure 11:
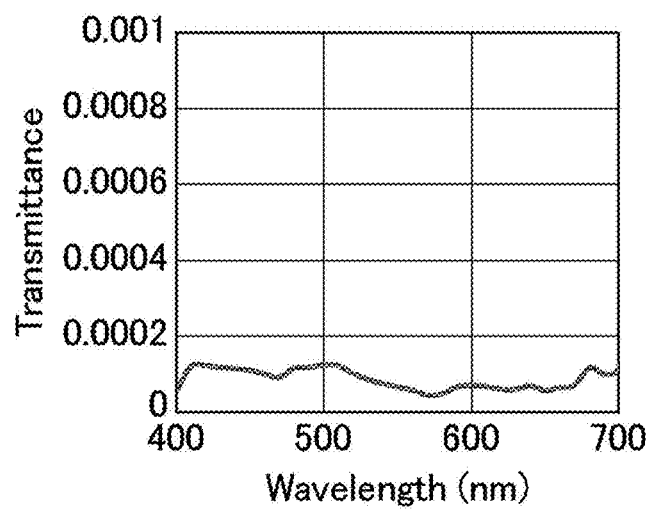
FIG. 11 is a graph that represents a transmission spectrum of black display that is obtained in the second simulation.

The retardation of the in-cell λ/4 plate 32 and the retardation of the out-cell λ/4 plate 31 agree with each other throughout all wavelengths, and the difference becomes as illustrated in FIG. 10. In this state, proper black display with low light leakage throughout all wavelengths may be obtained. A result of actual calculation of the transmission spectrum of black display is illustrated in FIG. 11. The transmittance Y for which visibility correction is performed is 0.000073, the chromaticity coordinates (x, y) are (0.243, 0.218), and those agree with the target values indicated above.

Note that by the above expression "a flat color filter substrate", when the overcoat layer on the color filters (color layers) sufficiently functions as a flattening film even if the film thicknesses of the color filters (color layers) of B, G, and R as main functional layers of the color filter substrate are uneven, the color filter substrate is presumed to be flat. Conversely, in a case where the film thickness of the overcoat layer is uneven even if the film thicknesses of the color layers of B, G, and R are not uneven, the color filter substrate is presumed to not correspond to "a flat color filter substrate".

(Third Simulation)

Figure 12:
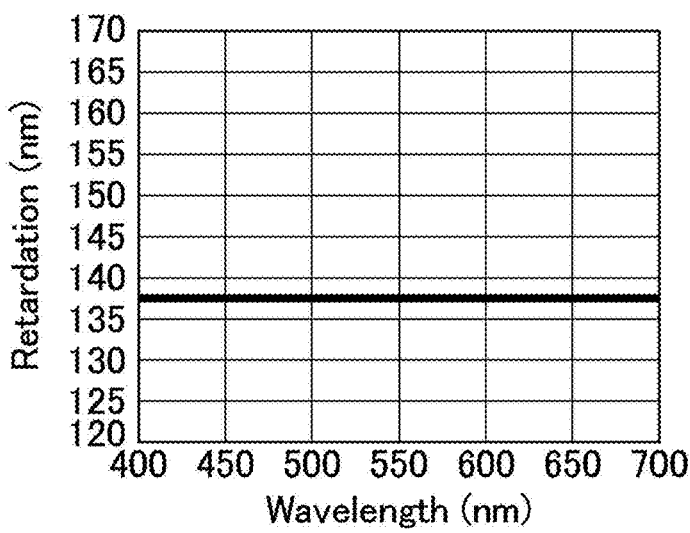
FIG. 12 is a graph that represents the retardation wavelength dispersion of an out-cell λ/4 plate (flat wavelength dispersion material), which was used in a third simulation.

Next, a case will be considered where the out-cell λ/4 plate 31 formed of a different material from the in-cell λ/4 plate 32 is used. Here, a case is considered where a retardation film formed of cycloolefin polymer (COP) as a flat wavelength dispersion material is used for the purpose of a heat resistance improvement. When it is assumed that "ZEONOR film ZF 14" from Zeon Corporation is used as a COP film, the wavelength dispersion characteristics of birefringence are Δn(450 nm)/Δn(550 nm)=1.00 and Δn(650 nm)/Δn(550 nm)=1.00. In a case where adjustment is performed such that the retardation at a wavelength of 550 nm as a designed center wavelength of a common retardation film becomes 137.5 nm, the retardation wavelength dispersion becomes as FIG. 12.

Figure 13:
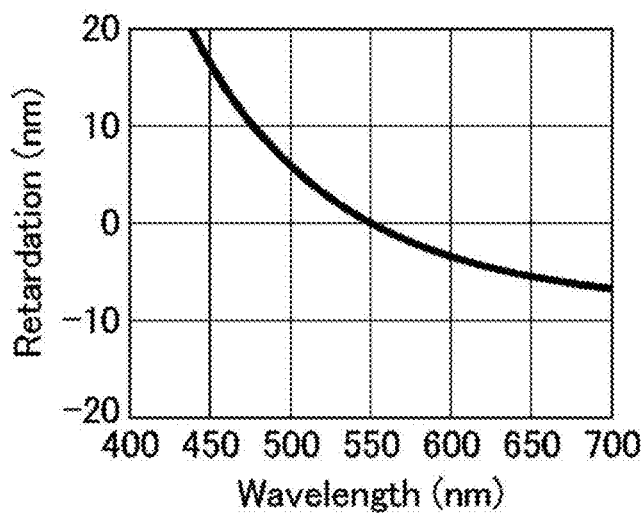
FIG. 13 is a graph that represents the difference between the retardation of an in-cell λ/4 plate and the retardation of the out-cell λ/4 plate, which were used in the third simulation.
Figure 14:
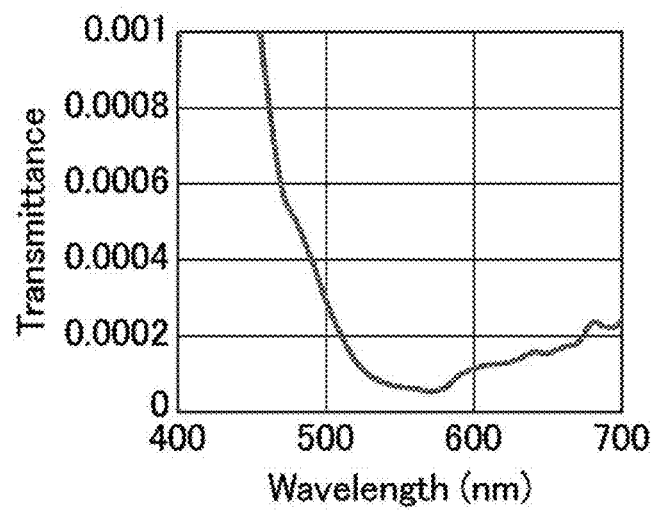
FIG. 14 is a graph that represents a transmission spectrum of black display that is obtained in the third simulation.

In this case, the retardation of the in-cell λ/4 plate 32 and the retardation of the out-cell λ/4 plate 31 do not agree with each other except at a wavelength of 550 nm, and the difference becomes as illustrated in FIG. 13. Thus, except at a wavelength of 550 nm, the in-cell λ/4 plate 32 and the out-cell λ/4 plate 31 may not cancel out the retardations, light leakage occurs to black display, and coloring occurs. A result of actual calculation of the transmission spectrum of black display is illustrated in FIG. 14. The transmittance Y for which visibility correction was performed was 0.000138, and the chromaticity coordinates (x, y) were (0.177, 0.054). Based on this result, black display was colored in blue.

(Fourth Simulation)

As described in the third simulation, in a case where the out-cell λ/4 plate 31 formed of a different material from the in-cell λ/4 plate 32 is used, black display is colored. Particularly, in a case where a retardation film formed of cycloolefin polymer (COP) is used for the purpose of a heat resistance improvement, coloring in blue occurs. Against this problem, a measure by color adjustment of the backlight will be considered. When it is desired to reduce blueness, blueness of the backlight may be reduced. That is, a more yellowish backlight than related art may be used.

Figure 15:
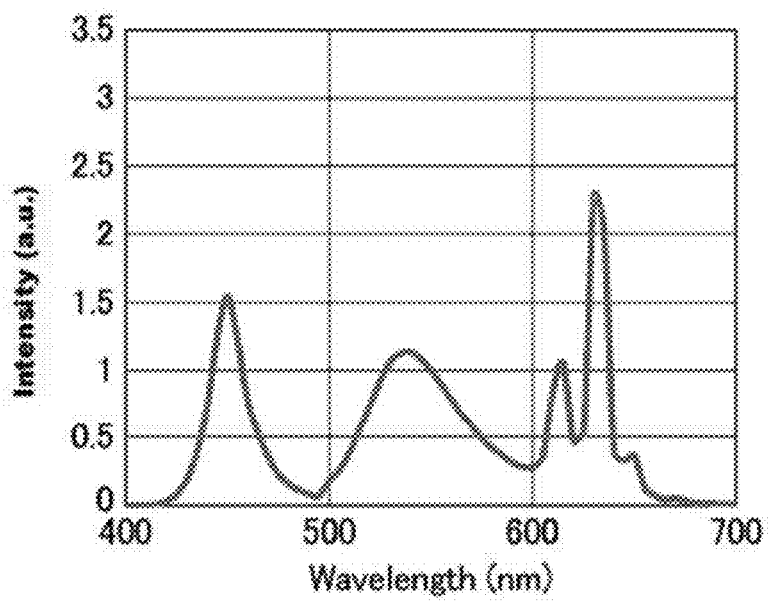
FIG. 15 is a graph that represents an example of a light emission spectrum of a more yellowish backlight than a standard backlight.

The light emission spectrum of an LED backlight for a common liquid crystal display in related art, which is illustrated in FIG. 4, corresponds to standard achromatic light emission. In the following, a backlight that has the light emission spectrum of FIG. 4 will also be referred to as a standard backlight. The calculated chromaticity coordinates (x, y) of the standard backlight were (0.286, 0.267). Meanwhile, FIG. 15 is a graph that represents an example of a light emission spectrum of a more yellowish backlight than the standard backlight. Note that similarly to FIG. 4, FIG. 15 is depicted while standardization is performed such that the intensity at a wavelength of 550 nm becomes 1. In the standardized light emission spectrum of FIG. 15, the peak intensity of blue light emission in the vicinity of a wavelength of 450 nm is 0.5 times as high as the standardized light emission spectrum of FIG. 4. In the following, the backlight whose peak intensity of blue light emission in the vicinity of a wavelength of 450 nm is X times as high as the standardized light emission spectrum of FIG. 4 will be referred to as "X times yellow backlight", and the backlight that has the light emission spectrum of FIG. 15 will be referred to as "0.5 times yellow backlight". The calculated chromaticity coordinates (x, y) of the 0.5 times yellow backlight were (0.336, 0.354).

Figure 16:
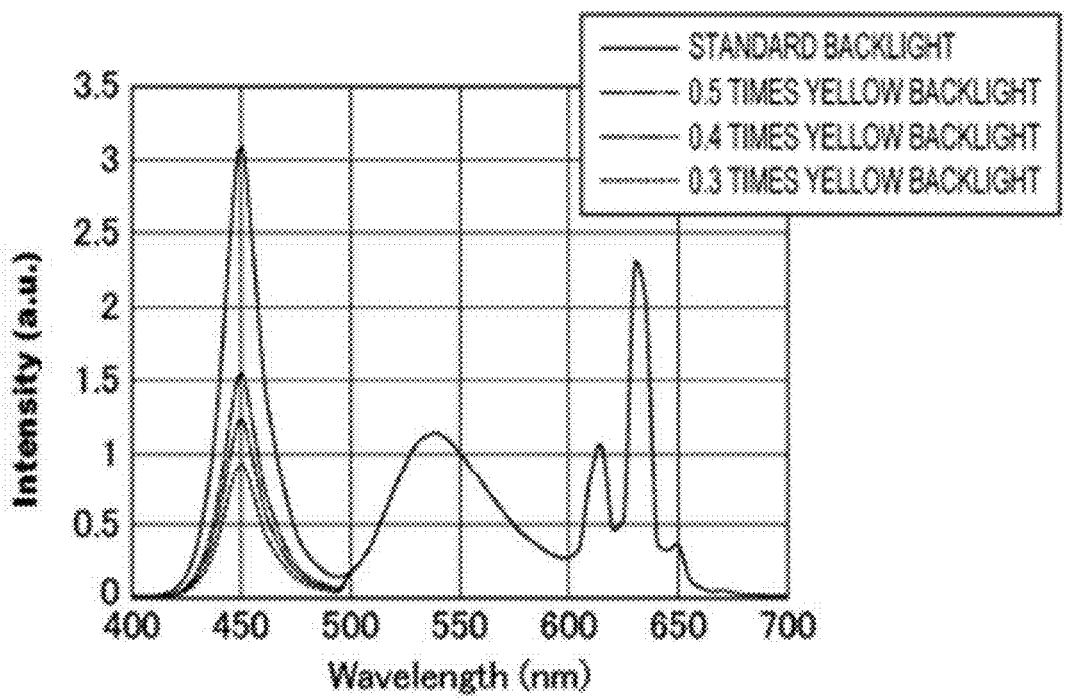
FIG. 16 is a graph that compares a light emission spectrum of the standard backlight with light emission spectra of 0.3 times, 0.4 times, and 0.5 times yellow backlights created based on the standard backlight.

Note that the light emission spectrum of the X times yellow backlight may be created by a calculation process and used for evaluation. Specifically, the range of 400 to 500 nm that corresponds to blue is first cut from the light emission spectrum of the standard backlight, the peak top at a wavelength of 450 nm is thereafter converted to X times intensity, the feet at a wavelength of 400 nm and a wavelength of 500 nm are converted to 1 times intensity, and conversion may be performed while the multiplying factor gradually and linearly changes from 1 times to X times in a portion between wavelengths of 400 and 450 nm and a portion between wavelengths of 500 and 450 nm. FIG. 16 is a graph that compares the light emission spectrum of the standard backlight with light emission spectra of 0.3 times, 0.4 times, and 0.5 times yellow backlights created based on the standard backlight.

When the colors of light emitted from 0.1 to 1.0 times yellow backlights obtained by the above calculation process are expressed by using chromaticity coordinates (x, y) of the XYZ color system, the chromaticity coordinates (x, y) are as indicated in the following Table 1. Note that in this specification, in the expression of chromaticity coordinates (x, y), three decimal places are expressed by rounding the fourth decimal place. However, for more specific indication, four decimal places are expressed in the following Table 1.

TABLE 1

|  | x | y |
| --- | --- | --- |
| Standard backlight | 0.2864 | 0.2669 |
| 0.9 times yellow backlight | 0.2940 | 0.2804 |
| 0.8 times yellow backlight | 0.3026 | 0.2955 |
| 0.7 times yellow backlight | 0.3122 | 0.3126 |
| 0.6 times yellow backlight | 0.3231 | 0.3320 |
| 0.5 times yellow backlight | 0.3356 | 0.3542 |
| 0.4 times yellow backlight | 0.3500 | 0.3799 |
| 0.3 times yellow backlight | 0.3669 | 0.4099 |
| 0.2 times yellow backlight | 0.3870 | 0.4455 |
| 0.1 times yellow backlight | 0.4111 | 0.4885 |

In the above Table 1, the 0.1 to 0.6 times yellow backlights have both of x and y 0.32 or greater and are more yellowish backlights than related art. Further, the 0.1 to 0.4 times yellow backlights have both of x and y 0.35 or greater and are much more yellowish backlights, and the 0.1 to 0.2 times yellow backlights have both of x and y 0.37 or greater and are further more yellowish backlights.

Note that the X times yellow backlight may be manufactured by using a known manufacturing method in related art. For example, in a backlight for a common liquid crystal display, an LED that emits blue light and phosphors such as yellow, green, and red are combined to provide white. However, it is possible to actually adjust the light emission spectrum of the backlight by optimizing selection of materials of phosphors or composition of colors. Further, it is also possible to adjust the light emission spectrum of the backlight by superimposing a color filter that has a center wavelength of absorption at a wavelength of 450 nm on the standard backlight.

As described in the third simulation, calculation was performed while assuming a case where the circularly-polarizing FFS mode liquid crystal panel was observed on the standard backlight, the transmittance Y for which visibility correction was performed was 0.000138, the chromaticity coordinates (x, y) were (0.177, 0.054), and black display was colored in blue. On the other hand, calculation was performed while assuming a case where the same circularly-polarizing FFS mode liquid crystal panel as the third simulation was observed on the 0.5 times yellow backlight, the transmittance Y for which visibility correction was performed was 0.000117, and the chromaticity coordinates (x, y) were (0.196, 0.084). From those results, it may be understood that blue coloring of black display is reduced by use of the 0.5 times yellow backlight. However, there is a concern that white display, which is basically desirably achromatic, is colored in yellow due to use of the 0.5 times yellow backlight.

(Fifth Simulation)

As described above, the parameters requested for the simulations of the black display state are the polarizers, the color filter layer, the spectrum of the light source, and the birefringence index $\Delta n$ (or the retardation value that is determined by the product of the birefringence $\Delta n$ and the film thickness d) of the reactive liquid crystal polymer as the material of the in-cell $\lambda/4$ plate 32 and the out-cell $\lambda/4$ plate 31. In the black display state, the horizontally aligned liquid crystal layer 17 has a retardation (birefringence). However, because the alignment direction is set to be parallel with or orthogonal to the azimuthal direction of the axis of the polarizer on the back surface side, the liquid crystal layer 17 was ignorable. On the other hand, in a white display state, because the liquid crystal layer 17 is in a different alignment state from the horizontal alignment, parameters such as characteristics of a liquid crystal material, a pitch of the comb-shaped electrode, and an applied voltage are requested for the simulation. Details of the parameters and design conditions used for calculation will be described in the following. All of those are conditions that are within the scope of known techniques and commonly employed in commercially available products and so forth.

The FFS mode liquid crystals (or IPS mode liquid crystals) have the liquid crystal layer 17, which contains liquid crystals which are horizontally aligned in a case where no voltage is applied, and an electrode pair, which generates a transverse electric field in the liquid crystal layer 17 by a voltage being applied, between a pair of substrates. Particularly, specifically exemplifying a case of the FFS mode, the electrode pair is configured with a pixel electrode that has plural rectangular openings which extend in parallel with each other and a common electrode that is arranged so as to be opposed to the pixel electrode with a dielectric layer interposed therebetween. Given that the width of each of the openings is set as S and the distance between the neighboring openings is set as L, both of L and S are commonly set to approximately 2 to 5 µm. In the simulation, as typical examples, L=2.2 µm and S=3.1 µm were used for calculation.

Because the birefringence index $\Delta n$ of a nematic liquid crystal material which configured the liquid crystal layer 17 and whose dielectric anisotropy was negative was set to 0.1 and a thickness (cell thickness) d of the liquid crystal layer 17 was set to 3 µm, $\Delta n d$ of the liquid crystal layer 17 was 300 nm. Further, a relative permittivity anisotropy $\Delta \varepsilon$ of the liquid crystal material was set to −4, and elastic moduli were set as K1=13.4 pN, K2=7.2 pN, and K3=15.4 pN. The alignment direction of liquid crystal molecules in a case where no voltage was applied and the extending direction of the comb-shaped electrode were set to form an angle of 80 degrees. The applied voltage to the liquid crystal layer 17 is dependent on the material of the liquid crystal layer 17 or the driving capability of a driver, but a value of approximately 3 to 7 V is usually selected.

First, the white display state in a case where the standard backlight is used is calculated. The applied voltage to the liquid crystal layer 17 was set to 3.7 V. Here, similarly to a case of a common liquid crystal display in related art, the same voltage was applied to each of R, G, and B sub-pixels. In this case, the transmittance Y for which visibility correction was performed was 0.0883, and the chromaticity coordinates (x, y) were (0.282, 0.273). Because the wavelength dispersion characteristics of the in-cell λ/4 plate 32 and the out-cell λ/4 plate 31 are not matched, black display is colored in blue, but white display does not have noticeable coloring.

Next, when the white display state in a case where the 0.5 times yellow backlight was used was calculated, the transmittance Y for which visibility correction was performed was 0.0881, and the chromaticity coordinates (x, y) were (0.329, 0.361). It may be understood that use of the yellow backlight reduced blue coloring of black display but caused yellow coloring of white display, which was basically desirably achromatic, as a disadvantage due to use of the yellow backlight.

As a measure against this yellow coloring, a method for optimally adjusting the driving voltage for each of the R, G, and B sub-pixels was devised. This is based on a finding that because the chromaticity coordinates (x, y) are dependent on the balance of transmittance of the R, G, and B sub-pixels, it may be possible to change the chromaticity coordinates by optimizing the driving voltage (applied voltage) for each of the R, G, and B sub-pixels. As a specific method for reducing yellowness of white display, increasing the relative transmittance of the B sub-pixel is possible. In order to achieve this purpose, a method for increasing the transmittance of the B sub-pixel and a method for reducing the transmittance of the sub-pixels other than B are possible, and using the two methods in combination is more effective. In order to increase (reduce) the transmittance, whether the applied voltage is increased or reduced may appropriately be adjusted. In a correlation curve between applied voltage and transmittance (V-T curve), in a region in which the transmittance monotonously increases or monotonously decreases with respect to the increase in the applied voltage, the increase and decrease in the transmittance correspond to the increase and decrease in the voltage. On the other hand, in a region in which a monotonous increase and a monotonous decrease do not occur, for example, in a region close to an inversion point at which the correlation curve has an extreme value and the tendencies of increase and decrease are inverted, adjustment is performed in accordance with the shape of the V-T curve.

Here, for understanding of the following study, main points of methods for defining transmittance and for calculating chromaticity will briefly be described.

Commonly, transmittance in the field of liquid crystal display devices indicates Y for which visibility correction is performed by using a color-matching function of a green component to which the sensitivity of a human eye is highest among tristimulus values X, Y, and Z based on the XYZ color system (CIE 1931 color system). That is, Y that is one of the tristimulus values corresponds to the transmittance in a case where certain light is viewed (measured) through a filter that has the maximum sensitivity in a green region. Transmittance indicates Y unless a particular description is made in this specification.

In a similar approach, X that is one of the tristimulus values corresponds to the transmittance in a case where certain light is viewed (measured) through a filter that has the maximum sensitivity in a red region. Further, Z that is one of tristimulus values corresponds to the transmittance in a case where certain light is viewed (measured) through a filter that has the maximum sensitivity in a blue region. That is, X, Y, and Z may be considered to be the transmittance of a red component, the green component, and a blue component, respectively, of light. Based on the balance of those, chromaticity x, y, and z may be defined as follows.

An expression $x=X/(X+Y+Z)$ represents the relative quantity of red transmittance. Redness is stronger as x is larger.

An expression $y=Y/(X+Y+Z)$ represents the relative quantity of green transmittance. Greenness is stronger as y is larger.

An expression $z=Z/(X+Y+Z)$ represents the relative quantity of blue transmittance. Blueness is stronger as z is larger.

However, z is not commonly used. Because $z=1-x-y$, z is uniquely determined when x and y are determined. Consequently, it may be considered that blueness becomes stronger as x and y become smaller.

As in the description made above, considering X, Y, and Z to be the transmittance of the red component, the green component, and the blue component, respectively, of light, X is to be focused on when the transmittance of the R sub-pixel is considered. Similarly, Y is to be focused on when the transmittance of the G sub-pixel is considered, and Z is to be focused on when the transmittance of the B sub-pixel is considered.

Figure 17:
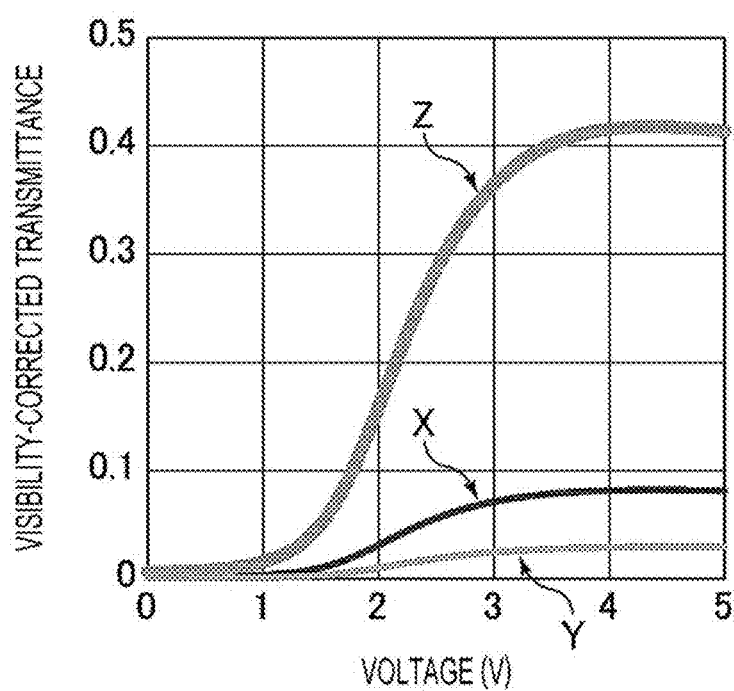
FIG. 17 is a graph that represents correlation curves between applied voltage and transmittance (V-T curves) in a B sub-pixel.
Figure 18:
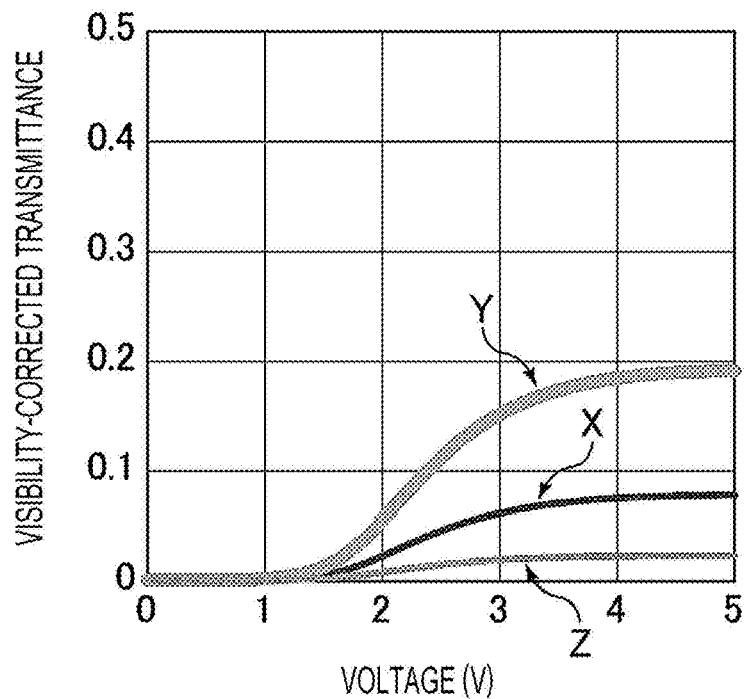
FIG. 18 is a graph that represents correlation curves between applied voltage and transmittance (V-T curves) in a G sub-pixel.
Figure 19:
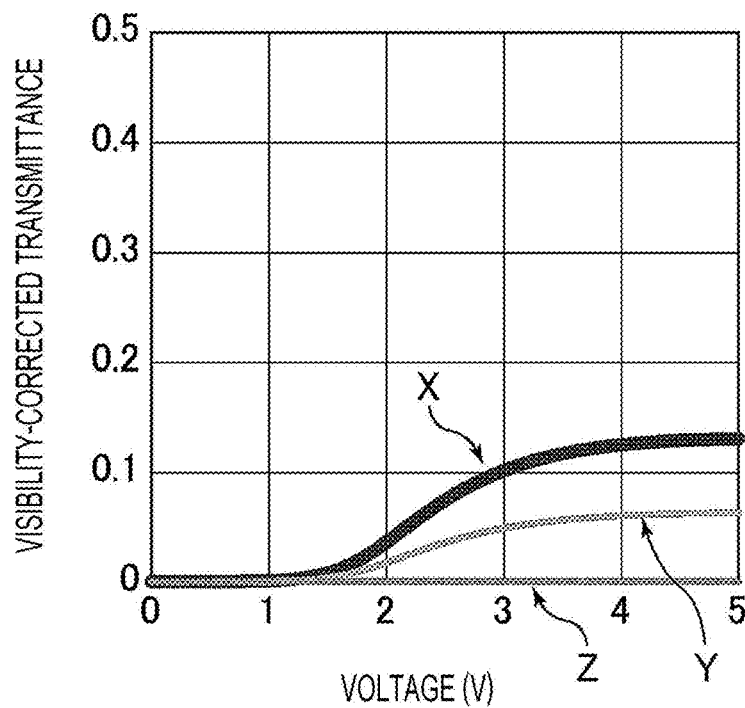
FIG. 19 is a graph that represents correlation curves between applied voltage and transmittance (V-T curves) in an R sub-pixel.

V-T curves of the liquid crystal display device that uses the out-cell λ/4 plate 31 formed of a different material from the in-cell λ/4 plate 32 are illustrated in FIGS. 17 to 19. FIG. 17 is a graph that represents correlation curves between applied voltage and transmittance (V-T curves) in the B sub-pixel. FIG. 18 is a graph that represents correlation curves between applied voltage and transmittance (V-T curves) in the G sub-pixel. FIG. 19 is a graph that represents correlation curves between applied voltage and transmittance (V-T curves) in the R sub-pixel. In a case where it is desired to adjust the relative transmittance of the B sub-pixel, the applied voltage may be investigated and determined by focusing on the V-T curve of Z in FIG. 17. In a case where it is desired to adjust the relative transmittance of the G sub-pixel, the applied voltage may be investigated and determined by focusing on the V-T curve of Y in FIG. 18. In a case where it is desired to adjust the relative transmittance of the R sub-pixel, the applied voltage may be investigated and determined by focusing on the V-T curve of X in FIG. 19.

In order to use the 0.5 times yellow backlight to reduce yellowness of white display of the liquid crystal display device in which 3.7 V is applied to each of the R, G, and B sub-pixels, the relative transmittance of the B sub-pixel may be increased. In order to achieve this purpose, it is desirable to use a combination of the method for increasing the transmittance of the B sub-pixel and the method for reducing the transmittance of the sub-pixels other than B. Focusing on the V-T curve of Z in FIG. 17, transmittance Z increases in accordance with the increase in the applied voltage to 4.4 V. When the voltage applied to the B sub-pixel is set higher than 3.7 V within a range of 4.4 V or lower, the transmittance of the B sub-pixel may be increased. Similarly, based on the V-T curve of Y in FIG. 18, when the voltage applied to the G sub-pixel is set lower than 3.7 V, the transmittance of the G sub-pixel may be reduced. Based on the V-T curve of X in FIG. 19, when the voltage applied to the R sub-pixel is set lower than 3.7 V, the transmittance of the R sub-pixel may be reduced.

Based on the above study, assessment of characteristics of each of practical examples and comparative examples that were set to conditions indicated in the following Table 2 was performed.

PRACTICAL EXAMPLE 1

In practical example 1, the out-cell λ/4 plate 31 formed of a different material from the in-cell λ/4 plate 32 is used, and in a liquid crystal display device that uses the 0.5 times yellow backlight, the applied voltages to the B sub-pixel, the G sub-pixel, and the R sub-pixel in white display are respectively set to 4.4 V, 2.3 V, and 2.3 V.

PRACTICAL EXAMPLES 2 AND 3

A liquid crystal display device of practical example 2 is the same as the liquid crystal display device of practical example 1 except that each of the applied voltages to the G sub-pixel and the R sub-pixel is changed to 2.5 V. A liquid crystal display device of practical example 3 is the same as the liquid crystal display device of practical example 1 except that each of the applied voltages to the G sub-pixel and the R sub-pixel is changed to 2.7 V.

PRACTICAL EXAMPLE 4

Blue coloring of black display may be reduced more in a case where the 0.4 times yellow backlight is used than a case where the 0.5 times yellow backlight is used. In this case, in order to obtain nearly achromatic white display, the applied voltages to the B sub-pixel, the G sub-pixel, and the R sub-pixel may respectively be set to 4.4 V, 2.1 V, and 2.1 V. That is, in practical example 4, the out-cell λ/4 plate 31 formed of a different material from the in-cell λ/4 plate 32 is used, and in a liquid crystal display device that uses the 0.4 times yellow backlight, the applied voltages to the B sub-pixel, the G sub-pixel, and the R sub-pixel in white display are respectively set to 4.4 V, 2.1 V, and 2.1 V.

PRACTICAL EXAMPLES 5 AND 6

A liquid crystal display device of practical example 5 is the same as the liquid crystal display device of practical example 4 except that each of the applied voltages to the G sub-pixel and the R sub-pixel is changed to 2.3 V. A liquid crystal display device of practical example 6 is the same as the liquid crystal display device of practical example 4 except that each of the applied voltages to the G sub-pixel and the R sub-pixel is changed to 2.5 V.

PRACTICAL EXAMPLE 7

Blue coloring of black display may be reduced more in a case where the 0.3 times yellow backlight is used than a case where the 0.5 times yellow backlight is used. In this case, in order to obtain nearly achromatic white display, the applied voltages to the B sub-pixel, the G sub-pixel, and the R sub-pixel may respectively be set to 4.4 V, 1.9 V, and 1.9 V. That is, in practical example 7, the out-cell λ/4 plate 31 formed of a different material from the in-cell λ/4 plate 32 is used, and in a liquid crystal display device that uses the 0.3 times yellow backlight, the applied voltages to the B sub-pixel, the G sub-pixel, and the R sub-pixel in white display are respectively set to 4.4 V, 1.9 V, and 1.9 V.

PRACTICAL EXAMPLES 8 AND 9

A liquid crystal display device of practical example 8 is the same as the liquid crystal display device of practical example 7 except that each of the applied voltages to the G sub-pixel and the R sub-pixel is changed to 2.1 V. A liquid crystal display device of practical example 9 is the same as the liquid crystal display device of practical example 7 except that each of the applied voltages to the G sub-pixel and the R sub-pixel is changed to 2.3 V.

COMPARATIVE EXAMPLE 1

In comparative example 1, the out-cell λ/4 plate 31 formed of a cured product of the same reactive liquid crystal polymer (reactive mesogen (RM)) as the in-cell λ/4 plate 32 is used, and in a liquid crystal display device that uses the standard backlight, each of the applied voltages to the B sub-pixel, the G sub-pixel, and the R sub-pixel in white display is set to the same voltage of 3.7 V.

COMPARATIVE EXAMPLE 2

In comparative example 2, the out-cell λ/4 plate 31 formed of a different material from the in-cell λ/4 plate 32 is used, and in a liquid crystal display device that uses standard backlight, each of the applied voltages to the B sub-pixel, the G sub-pixel, and the R sub-pixel in white display is set to the same voltage of 3.7 V.

COMPARATIVE EXAMPLE 3

In comparative example 3, the out-cell λ/4 plate 31 formed of a different material from the in-cell λ/4 plate 32 is used, and in a liquid crystal display device that uses the 0.5 times yellow backlight, each of the applied voltages to the B sub-pixel, the G sub-pixel, and the R sub-pixel in white display is set to the same voltage of 3.7 V.

(Evaluation of Simulations)

The display characteristics of black display and white display in the practical examples and comparative examples were obtained by simulations, and the obtained results were evaluated with the following criteria. The evaluation results are indicated in the following Table 2.

(1) Chromaticity Coordinates in Black Display (blackness Degree)

○: Coloring may not be recognized.

Δ: Slight blue coloring may be recognized, but there is no problem in practical use.

×: Blue coloring is obviously seen.

(2) Chromaticity Coordinates in White Display (whiteness Degree)

○: Coloring may not be recognized.

Δ: Slight yellow coloring may be recognized, but there is no problem in practical use.

×: Yellow coloring is obviously seen.

(3) Transmittance Y in White Display for which Visibility Correction is Performed (White Transmittance)

○: 0.050 or greater

Δ: 0.025 or greater and less than 0.050

(4) Heat Resistance

○: The retardation of the out-cell λ/4 plate 31 is not lowered due to a heat resistance test, and light leakage does not occur after the heat resistance test.

×: The retardation of the out-cell λ/4 plate 31 is lowered due to the heat resistance test, and light leakage occurs after the heat resistance test.

TABLE 2

|  | Comparative example 1 | Comparative example 2 | Comparative example 3 | Practical example 1 | Practical example 2 | Practical example 3 |
|---|---|---|---|---|---|---|
| Out-cell $\lambda/4$ plate | RM | COP | COP | COP | COP | COP |
| In-cell $\lambda/4$ plate | RM | RM | RM | RM | RM | RM |
| Backlight | Standard | Standard | Yellow 0.5 | Yellow 0.5 | Yellow 0.5 | Yellow 0.5 |
| Blackness degree (x, y) | ○ (0.243, 0.218) | X (0.177, 0.054) | Δ (0.196, 0.084) | Δ (0.196, 0.084) | Δ (0.196, 0.084) | Δ (0.196, 0.084) |
| Whiteness degree (x, y) | ○ (0.283, 0.278) | ○ (0.282, 0.273) | X (0.329, 0.361) | ○ (0.280, 0.283) | ○ (0.312, 0.308) | ○ (0.305, 0.324) |
| White transmittance Y | ○ 0.0878 | ○ 0.0883 | ○ 0.0881 | Δ 0.0484 | ○ 0.0610 | ○ 0.0663 |
| White voltage (B, G, R) | (3.7 V, 3.7 V, 3.7 V) | (3.7 V, 3.7 V, 3.7 V) | (3.7 V, 3.7 V, 3.7 V) | (4.4 V, 2.3 V, 2.3 V) | (4.4 V, 2.5 V, 2.5 V) | (4.4 V, 2.7 V, 2.7 V) |
| Heat resistance | X | ○ | ○ | ○ | ○ | ○ |

|  | Practical example 4 | Practical example 5 | Practical example 6 | Practical example 7 | Practical example 8 | Practical example 9 |
|---|---|---|---|---|---|---|
| Out-cell $\lambda/4$ plate | COP | COP | COP | COP | COP | COP |
| In-cell $\lambda/4$ plate | RM | RM | RM | RM | RM | RM |
| Backlight | Yellow 0.4 | Yellow 0.4 | Yellow 0.4 | Yellow 0.3 | Yellow 0.3 | Yellow 0.3 |
| Blackness degree (x, y) | Δ (0.205, 0.097) | Δ (0.205, 0.097) | Δ (0.205, 0.097) | ○ (0.218, 0.118) | ○ (0.218, 0.118) | ○ (0.218, 0.118) |
| Whiteness degree (x, y) | ○ (0.274, 0.280) | ○ (0.295, 0.313) | Δ (0.309, 0.336) | ○ (0.264, 0.274) | ○ (0.293, 0.318) | Δ (0.313, 0.350) |
| White transmittance Y | Δ 0.0375 | Δ 0.0482 | ○ 0.0579 | Δ 0.0267 | Δ 0.0372 | Δ 0.0479 |
| White voltage (B, G, R) | (4.4 V, 2.1 V, 2.1 V) | (4.4 V, 2.3 V, 2.3 V) | (4.4 V, 2.5 V, 2.5 V) | (4.4 V, 1.9 V, 1.9 V) | (4.4 V, 2.1 V, 2.1 V) | (4.4 V, 2.3 V, 2.3 V) |
| Heat resistance | ○ | ○ | ○ | ○ | ○ | ○ |

As indicated in the above Table 2, as for the white display state obtained for comparative example 1 by calculation, the transmittance Y for which visibility correction was performed was 0.0878, and the chromaticity coordinates (x, y) were (0.283, 0.278). In comparative example 1, because the wavelength dispersion characteristics of the in-cell $\lambda/4$ plate 32 and the out-cell $\lambda/4$ plate 31 agree with each other, black display is not colored in blue even if the standard backlight is used. Further, because the standard backlight is used, white display is not colored in yellow either. Consequently, the values of the blackness degree, the whiteness degree, and the white transmittance that are obtained in comparative example 1 become the target values. However, the liquid crystal display device of comparative example 1 had inferior heat resistance because due to use of the out-cell $\lambda/4$ plate 31 formed of the cured product of the reactive liquid crystal polymer (reactive mesogen (RM)), the retardation of the out-cell $\lambda/4$ plate 31 lowered in the heat resistance test and light leakage occurred after the heat resistance test. On the other hand, the liquid crystal display devices of comparative examples 2 and 3 and practical examples 1 to 9 used the out-cell $\lambda/4$ plate 31 formed of cycloolefin polymer (COP) and thus had proper heat resistance.

The liquid crystal display device of comparative example 2 had proper heat resistance. However, because the retardation wavelength dispersion of the in-cell $\lambda/4$ plate 32 and the retardation wavelength dispersion of the out-cell $\lambda/4$ plate 31 were not suited to each other and the standard backlight was used, black display was colored in blue. Further, the liquid crystal display device of comparative example 3 used the 0.5 times yellow backlight and was thereby capable of inhibiting blue coloring of black display. However, because the applied voltages to the B sub-pixel, the G sub-pixel, and the R sub-pixel in white display were the same, white display was colored in yellow.

On the other hand, in the liquid crystal display devices of practical examples 1 to 9, because the applied voltages to the G sub-pixel and the R sub-pixel were lowered and adjustment for increasing the relative transmittance of the B sub-pixel was thereby performed, although the white transmittance lowered, nearly achromatic white display that was almost equivalent to comparative example 1 was obtained in spite of using the 0.5 times yellow backlight.

[Additional Matters]

One aspect of the present invention provides a liquid crystal display device including a liquid crystal display panel and a backlight. The liquid crystal display panel, in order from an observation surface side to a back surface side, includes: a first linear polarizer; a first $\lambda/4$ retardation layer that has an in-plane slow axis in a first direction; a first substrate; a second $\lambda/4$ retardation layer that is configured with a different material from the first $\lambda/4$ retardation layer and has an in-plane slow axis in a second direction which is orthogonal to the first direction; a liquid crystal layer that contains liquid crystals which are horizontally aligned in a case where no voltage is applied; plural electrode pairs that generate a transverse electric field in the liquid crystal layer by a voltage being applied; a second substrate; and a second linear polarizer. In a case where a color of light emitted from the backlight is expressed by using chromaticity coordinates (x, y) of an XYZ color system, both of x and y are 0.32 or greater. The plural electrode pairs include a red electrode pair arranged in a red sub-pixel, a green electrode pair arranged in a green sub-pixel, and a blue electrode pair arranged in a blue sub-pixel. A white display applied voltage of the blue electrode pair is different from the white display applied voltage of the red electrode pair and the white display applied voltage of the green electrode pair.

All of the white display applied voltage of the blue electrode pair, the white display applied voltage of the red electrode pair, and the white display applied voltage of the green electrode pair may be included in a voltage region in which light transmittance of the liquid crystal display panel monotonously increases with respect to an increase in a voltage, and the white display applied voltage of the blue electrode pair may be a higher voltage than the white display applied voltage of the red electrode pair and the white display applied voltage of the green electrode pair.

In a case where a birefringence index with respect to light at a wavelength of $\lambda$ nm is set as $\Delta n(\lambda)$, the first $\lambda/4$ retardation layer may be configured with a flat wavelength dispersion material that satisfies the following formulas (1) and (2). The flat wavelength dispersion material may be cycloolefin polymer.

$$0.99 < \Delta n(450 \text{ nm})/\Delta n(550 \text{ nm}) < 1.03 \quad (1)$$

$$0.98 < \Delta n(650 \text{ nm})/\Delta n(550 \text{ nm}) < 1.01 \quad (2)$$

In a case where a birefringence index with respect to light at a wavelength of $\lambda$ nm is set as $\Delta n(\lambda)$, the second $\lambda/4$ retardation layer may be configured with a positive wavelength dispersion material in which $\Delta n(450 \text{ nm})/\Delta n(550 \text{ nm})$ is 1.03 or greater and $\Delta n(650 \text{ nm})/\Delta n(550 \text{ nm})$ is 0.98 or less. The positive wavelength dispersion material may be a cured product of a reactive liquid crystal polymer.

REFERENCE SIGNS LIST 3 backlight
10 liquid crystal display panel
11 first linear polarizer
13 first substrate
14 color filter layer
14B blue color filter
14G green color filter
14R red color filter
15 overcoat layer
17 liquid crystal layer
18 second substrate
19 second linear polarizer
21 support substrate
22 common electrode (planar electrode)
22R red common electrode
22G green common electrode
22B blue common electrode
23 insulating film
24 pixel electrode (comb-shaped electrode)
24R red pixel electrode
24G green pixel electrode
24B blue pixel electrode
31 first $\lambda/4$ retardation layer (out-cell $\lambda/4$ plate)
32 second $\lambda/4$ retardation layer (in-cell $\lambda/4$ plate)
BL black matrix

The invention claimed is:

1. A liquid crystal display device comprising:
a liquid crystal display panel; and
a backlight, wherein
the liquid crystal display panel, in order from an observation surface side to a back surface side, includes:
 a first linear polarizer;
 a first $\lambda/4$ retardation layer that has an in-plane slow axis in a first direction;
 a first substrate;
 a second $\lambda/4$ retardation layer that is configured with a different material from the first $\lambda/4$ retardation layer and has an in-plane slow axis in a second direction which is orthogonal to the first direction;
 a liquid crystal layer that contains liquid crystals which are horizontally aligned where no voltage is applied;
 plural electrode pairs that generate a transverse electric field in the liquid crystal layer by a voltage being applied;
 a second substrate; and
 a second linear polarizer,
where a color of light emitted from the backlight is expressed by using chromaticity coordinates (x, y) of an XYZ color system, both of x and y are 0.32 or greater,
the plural electrode pairs include a red electrode pair arranged in a red sub-pixel, a green electrode pair arranged in a green sub-pixel, and a blue electrode pair arranged in a blue sub-pixel, and
a white display applied voltage of the blue electrode pair is different from a white display applied voltage of the red electrode pair and a white display applied voltage of the green electrode pair.

2. The liquid crystal display device according to claim 1, wherein
all of the white display applied voltage of the blue electrode pair, the white display applied voltage of the red electrode pair, and the white display applied voltage of the green electrode pair are included in a voltage region in which light transmittance of the liquid crystal display panel monotonously increases with respect to an increase in a voltage, and
the white display applied voltage of the blue electrode pair is a higher voltage than the white display applied voltage of the red electrode pair and the white display applied voltage of the green electrode pair.

3. The liquid crystal display device according to claim 1, wherein where a birefringence index with respect to light at a wavelength of $\lambda$ nm is set as $\Delta n(\lambda)$, the first $\lambda/4$ retardation layer is configured with a flat wavelength dispersion material that satisfies following formulas (1) and (2), $$0.99 < \Delta n(450 \text{ nm})/\Delta n(550 \text{ nm}) < 1.03 \quad (1)$$

$$0.98 < \Delta n(650 \text{ nm})/\Delta n(550 \text{ nm}) < 1.01 \quad (2)$$

4. The liquid crystal display device according to claim 3, wherein the flat wavelength dispersion material is cycloolefin polymer.

5. The liquid crystal display device according to claim 1, wherein where a birefringence index with respect to light at a wavelength of $\lambda$ nm is set as $\Delta n(\lambda)$, the second $\lambda/4$ retardation layer is configured with a positive wavelength dispersion material in which Δn(450 nm)/Δn(550 nm) is 1.03 or greater and Δn(650 nm)/Δn(550 nm) is 0.98 or less.

6. The liquid crystal display device according to claim 5, wherein the positive wavelength dispersion material is a cured product of a reactive liquid crystal polymer.

* * * * *